US005805209A

United States Patent [19]

Yuge et al.

[11] Patent Number: 5,805,209

[45] Date of Patent: Sep. 8, 1998

[54] VEHICLE CAMERA SYSTEM

[75] Inventors: Junjiro Yuge, Ayabe; Masaharu Nishino, Muko, both of Japan

[73] Assignee: Omron Corporation, Kyoto, Japan

[21] Appl. No.: 833,465

[22] Filed: Apr. 7, 1997

Related U.S. Application Data

[63] Continuation of Ser. No. 408,861, Mar. 23, 1995.

[30] Foreign Application Priority Data

Mar. 24, 1994 [JP] Japan .................................... 6-053803

[51] Int. Cl.$^{6}$ ........................................ H04N 7/18

[52] U.S. Cl. .......................... 348/149; 340/937; 348/143

[58] Field of Search .................................... 348/148, 149, 348/143; 346/107 VP; 340/937; H04N 7/18

[56] References Cited

U.S. PATENT DOCUMENTS

| | | | |
|---|---|---|---|
| 5,066,950 | 11/1991 | Schweitzer | 340/937 |
| 5,101,200 | 3/1992 | Swett | 340/937 |
| 5,282,092 | 1/1994 | Wilhelms | 360/5 |
| 5,331,312 | 7/1994 | Kudoh | 348/149 |
| 5,432,547 | 7/1995 | Toyama | 348/149 |

*Primary Examiner*—Howard W. Britton

*Attorney, Agent, or Firm*—Dickstein Shapiro Morin & Oshinsky, LLP

[57] ABSTRACT

A vehicle camera system for obtaining picture data of a runaway vehicle is provided in a toll road system. A vehicle passing a tollgate (4) is picked up by a camera (6). As a license plate of a vehicle is detected, picture data are cyclically and subsequently stored in a pluarlity of fram memories (20). When the vehicle dishonestly leaves without paying a toll, a tollbooth attendant (m) depresses a push button (3) to generate an instruction signal so that one or a plurality of picture data just before the timing of such depression can be read out from the frame memory (20) to be transmitted to a central unit for separate storage. The instruction signal may also be generated automatically based on detection of the vehicle.

66 Claims, 31 Drawing Sheets

VEHICLE CAMERA SYSTEM

This application is a continuation, of application Ser. No. 08/408,861, filed Mar. 23, 1995, now abandoned.

BACKGROUND OF THE INVENTION

1. Field of the Invention

This invention relates to a vehicle camera system for taking a picture of a vehicle or an automobile, and more particularly to an improved system for taking a picture of an automobile at a toll gate of a toll road as an evidence which is effective to request a toll payment from a driver of the automobile when the driver runs away from the toll gate without paying a predetermined toll.

2. Discussion of the Related Art

There has been proposed heretofore a vehicle camera system, in which a tollbooth attendant depresses a push button switch when the attendant finds a vehicle running away from a tollgate without paying a predetermined toll or without paying a full amount of the toll so that a shutter release signal may be applied to a camera for initiating the camera to take a picture of the runaway vehicle. This system, however, has the disadvantage that the attendant is apt to delay the depression of the push button, whereby the picture of the runaway vehicle is partially taken or no picture is taken because the vehicle is out of viewing range of the camera system.

There also has been proposed another vehicle camera system, in which, as a vehicle is detected by a sensor at a tollgate, the camera continues to pick up the vehicle and takes a picture which is stored when a tollbooth attendant notices the runaway vehicle. This system also has the disadvantage that the timing of depression of the push button is delayed when the runaway vehicle runs at a high speed, whereby a picture of the vehicle is partially stored or no picture is stored because it is out of the frame of the camera. Even if the timing of the depression is successful, an adequate picture is not taken because of the high speed running.

Such conventional systems request tollbooth attendant's quick motion for depressing the push button with a perfect timing, so that a heavy work load is applied to the attendant.

SUMMARY OF THE INVENTION

It is, therefore, a primary object of this invention to provide an improved vehicle camera system capable of obtaining picture data of a runaway vehicle without errors.

According to one aspect of this invention, there is provided a vehicle car system which includes a camera means for taking a picture of a vehicle passing a gate, a picture storing means for storing the picture taken by the camera means, a reading means in response to entry of a read instruction signal for reading out picture data of one or a plurality of pictures at least just before the timing of the entry from the picture storing means, and a storing means for separately storing the read out picture data.

The camera means may employ a camera, and the picture storing means may employ a buffer memory.

The picture storing means may be designed to subsequently revise the oldest picture data in a plurality of the temporarily stored picture data. The buffer memory may be composed of a plurality of frame memories each storing one frame of picture data. Moreover, the picture storing means may be provided with a means for applying a cyclic writing instruction of picture data to the plurality of frame memories so as to apply a writing instruction to a subsequent frame memory at several frame periods.

This vehicle camera system may include a dishonest pass vehicle detection means for detecting a vehicle dishonestly passing the gate. The reading means for reading picture data may be designed to respond to the detection of the dishonest vehicle instead of the read instruction signal so as to read out picture data of one or a plurality of pictures at least just before the timing of the detection of the dishonest vehicle.

The camera may be located on a road forward of the gate, on an arm crossing the road of the gate, or mounted on a pole standing on an island of the gate.

The camera is desirable to have a view range which picks up a picture image of a license plate of a vehicle which stops at a stop position at the gate, and the license plate and driver of the vehicle which is positioned at a forward position of the stop position.

The vehicle camera system may further employ a monitor for displaying a plurality of picture data read out from the buffer memory, and a means for selecting which picture data should be separately stored by watching the plurality of picture data displayed on the monitor. The system may also employ a dishonest vehicle picture memory for storing all picture data read out from the buffer memory, a means for displaying a dishonest picture based on the picture data stored in the dishonest vehicle picture memory, and a picture selecting means for selecting a picture from the plurality of pictures displayed on the monitor.

The system may employ a vehicle detection means for detecting a vehicle passing the gate, and a write instruction means for instructing picture data to be stored in the buffer memory based in response to entry of a detection signal of the vehicle.

The system may detect a vehicle from a first detection point through a second detection point where a license plate can be picked up by camera, and instruct writing of picture data during the detection period.

The gate may be set at a tollgate of a toll road, or a parking lot.

The system may employ a license plate detection means for detecting a license plate of a vehicle based on picture data picked up by the camera, and a means for making storage of picture data in the buffer memory effective based on the entry of a detection signal of the license plate. The system may be designed for installation at the gate of an unmanned parking lot, and include a detecting means for detecting whether the vehicle has moved forward or backward from the stop position and a means for generating a read instruction signal in response to receipt of the toll or an output from the detecting means.

The above-mentioned license plate detection means for detecting the license plate may be designed to differentiate the input picture data in a horizontal scanning direction to be digitized and to detect an edge thereof along a vertical scanning direction so that a plate candidate line be made when the number of the detected edges in a predetermined width in the horizontal scanning direction is within a predetermined range and detection of the license plate can be produced when a predetermined number of the plate candidate lines continue in the vertical scanning direction. The write instruction means may be designed to instruct each frame memory to cyclically write one frame of picture data when a detection signal representing the existence of a license plate is entered from the license plate detection means and to instruct an overwrite of a picture to one of the frame memories when a detection signal representing non-existence of any license plate is entered from the same.

The gate may be provided with an operation unit such as a push button for manually generating a read out instruction signal for reading out picture data from the buffer memory. Picture data of a vehicle may be cyclically stored in the respective frame memories when the vehicle detection means detects a vehicle, but upon the operation of the operation unit the picture data prior to the timing of the operation may be read out from the frame memory corresponding thereto.

The system may include a means for transmitting the picture data read out from the buffer memory to a central unit which includes a means for receiving the transmitted picture data and a means for separately storing therein the received picture data. The input picture data may be alternatively stored into the respective frame memories temporarily, and as the license plate detection means detects the existence of a license plate, the picture data read out from one of the frame memories is compressed by a picture compression unit to be stored into a mass storage.

The system may include a means for recognizing characters of a detected license plate, and a storage for storing therein the picture data corresponding to a vehicle of the previously recognized license plate when the recognized characters do not correspond to the characters of its previously recognized license plate.

The vehicle camera system of this invention may be applied to a road pricing system.

According to a vehicle picture pickup method of this invention, a vehicle passing the gate is picked up by a camera, the picked up picture data is temporarily stored into a buffer memory, one or a plurality of picture data at least just before a timing of a read out instruction are read out from the buffer memory, and the read out picture data is separately stored.

The camera means takes picture data of a vehicle passing the gate, the picture storage means stores the taken picture data temporarily. As a read out instruction signal is generated by a predetermined operation or motion by a tollbooth attendant finding a dishonest runaway vehicle, one or a plurality of picture data are read out to be stored separately. The read out and stored picture data are closest and prior to the entry timing of the read out instruction signal, whereby the picture data of the runaway vehicle can be obtained even if the timing of the operation is delayed. Thus, the tollbooth attendant is not requested to do an over fast response and relieved from such an operation load.

The picture storage means may employ a small capacity storage by subsequently revising and storing the oldest one of the plurality of the temporarily stored picture data, and be a buffer memory combined with several frame memories. The picture data are cyclically written into the plurality of frame memories and moved into subsequent frame memories by several frame periods so that the memory capacity can be reduced.

The picture data are read out in response to the detection of a dishonest vehicle by the dishonest passing vehicle detection means, whereby the operation for finding a dishonest vehicle is not requested to a tollbooth attendant.

Generally, the camera is installed on a road ahead of the gate. When there are many gates, a plurality of cameras are mounted on an arm crossing the road corresponding to the respective gates. When such an arm cannot be built or there are small number of gates, the cameras may be mounted on poles standing on the islands of gates. The former is suitable to a large scale gate, and the latter is suitable to a small scale gate.

When the camera picks up a vehicle, a driver in addition to a license plate should be picked up because it is effective on deciding claim of the toll to the dishonest driver.

The picture data to be stored are designed to be visually confirmed in advance, whereby a picture including sufficient data, preferably a license plate and a driver, for determining the person to be charged can be stored.

The start of pickup by the camera may be based on not only the detection of a license plate but also the detection of the vehicle itself, which can provide a simplified construction, and enables easy detection in comparison with the license plate detection.

When a vehicle is picked up by a camera, it should be picked up together with its license plate so that upon detection of the license plate the camera can start to pick up the vehicle.

The detection of license plate may be performed by detection of edges by digital in a horizontal direction and by the existence of a number of edges being in the horizontal direction within a predetermined range and continuing in a vertical direction to a certain extent, resulting in a precise detection of the license plate.

In the system including a terminal installed near a gate, a central unit installed in a building (center) remote from the gate and a circuit (cable of wireless) connecting the terminal with the central unit, the central unit can collectively store picture data of runaway vehicles from the terminals in various points and management of later procedures is simplified. Storage of motion pictures of the runaway vehicles provides of which vehicle failed to pay a toll evidence.

This kind of vehicle camera system is useful in a tollgate of a toll road, a manned or unmanned parking lot, and a road pricing system.

BRIEF DESCRIPTION OF THE DRAWINGS

Other objectives and advantages of this invention will be more readily apparent from the following detailed description provided in conjunction with the following figures, of which.

DETAILED DESCRIPTION OF THE INVENTION

First Embodiment

Figure 1:
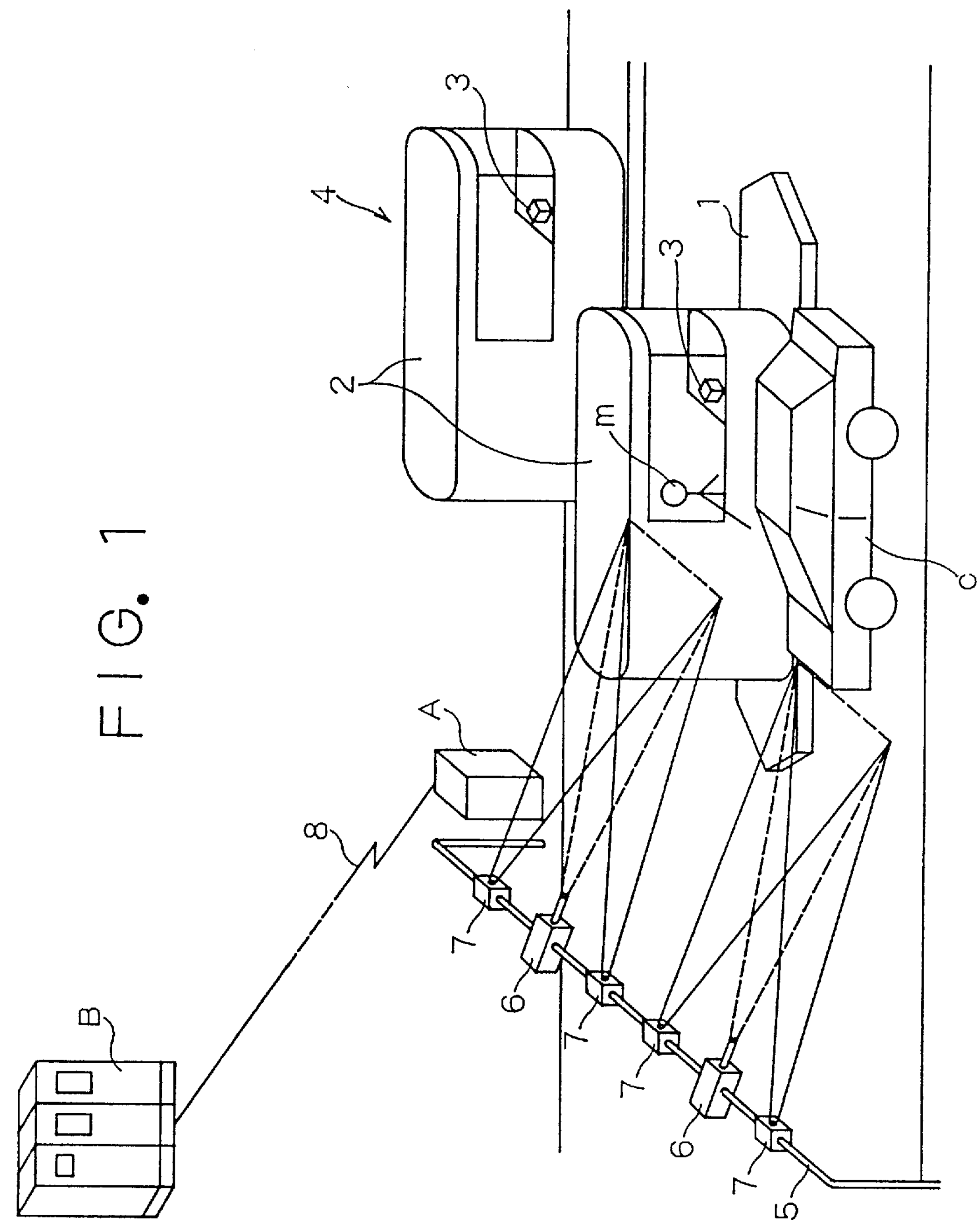
FIG. 1 is schematic perspective view of a vehicle camera system as a first embodiment of this invention.

Referring, now, to FIG. 1, there is shown a schematic perspective view of a vehicle camera system as a first embodiment of this invention, illustrating a tollgate of a toll road and its neighborhood as an example of a gate passed by a vehicle.

There is disposed a booth 2 having a chamber accommodating a tollbooth attendant "m" on island 1 built beside each traffic lane. In each booth there are disposed a toll register, a receipt issuing machine, and a push button 3 for generating a read out instruction signal by a manual operation when a runaway vehicle is found. The push button 3 is disposed to be touched by a hand of the attendant "m".

A large gate-shaped arm 5 is built to cross a road ahead of such a toll gate 4, and mounted by the same number of cameras 6 as the number of booths 2 as a camera means. A pair of illuminating devices 7 on both sides of each camera 6 are mounted on the arm 5. Each camera 6 has a visual field picking up a license plate position of a vehicle "c" stopping at a predetermined stop position in front of each booth 2 but not picking a driver position. Both illuminating devices 7 take aim at a direction to illuminate the license plate position of the stopping vehicle "c" and its forward field. The illuminating devices 7 are used at night when the sensitivity of the camera is lowered. Though the illuminating devices 7 may be manually turned on and off, they are desirable to be automatically turned on or off in response to a signal from an illumination sensor. The distance from booth 2 to arm 5 is about 10 meters to 15 meters and the height of arm 5 is about 5 meters to 7 meters.

A terminal A is disposed beside a base of the arm 5 at a shoulder of the road, and connected with a central unit B disposed in a predetermined building (center) through a telephone circuit 8. In this embodiment the terminal A can be connected with twelve cameras 6 at a maximum.

Figure 2:
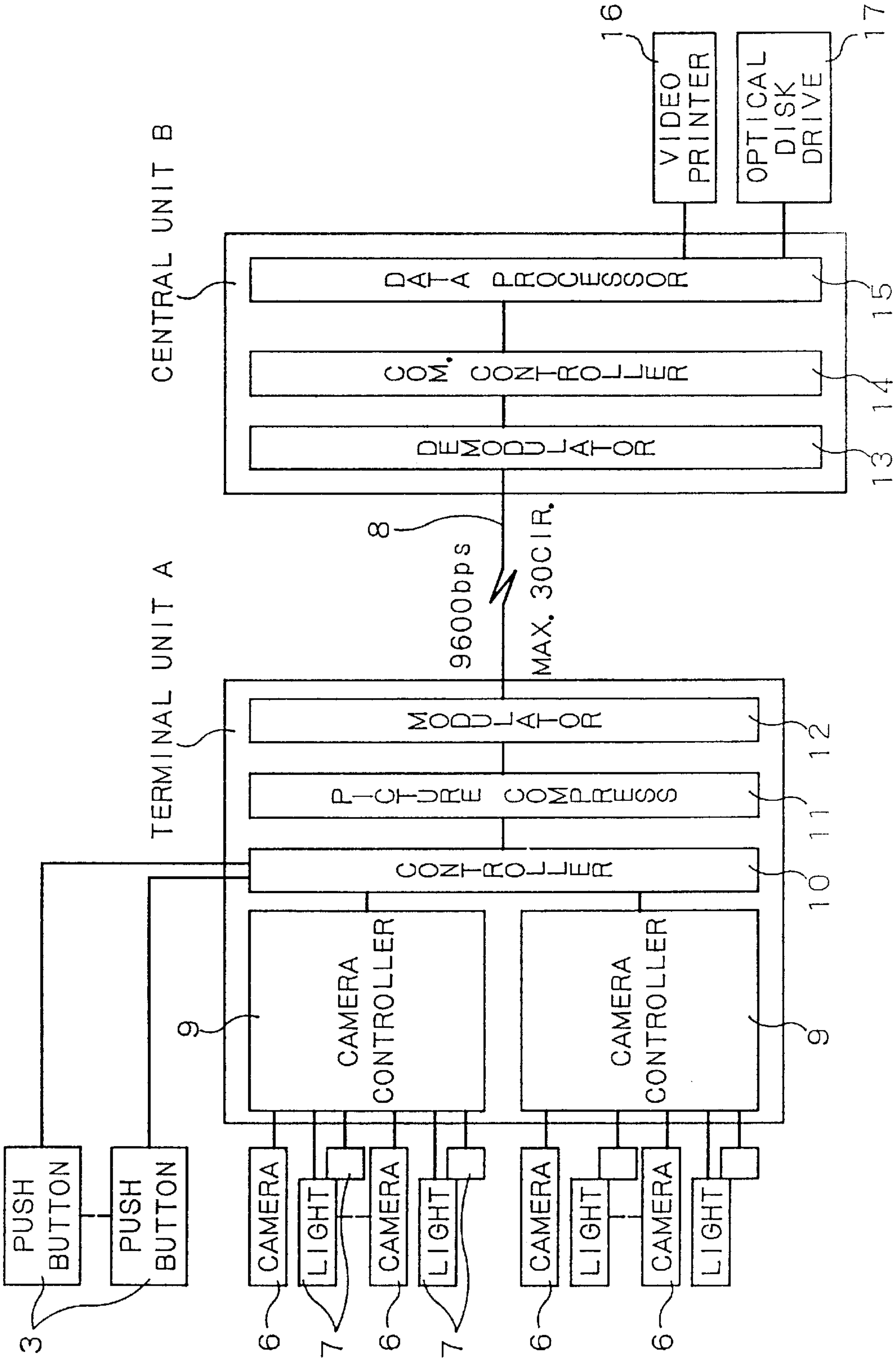
FIG. 2 is a schematic block diagram of the vehicle camera system of FIG. 1.

FIG. 2 is a block diagram of the vehicle camera system of FIG. 1. The terminal A includes a plurality of camera controllers 9, a controller 10, a picture compressor 11, and a modulator 12. Each camera controller 9 is connected with a plurality of cameras 6 and illuminating devices 7 disposed on both sides of each camera 6. Controller 10 is connected with a plurality of push button switches 3.

The central unit B includes a demodulator 13, a communication controller 14, and a data processor 15 connected with a video printer 16 and an optical disk drive 17 for separately storing picture data of a runaway vehicle.

Figure 3:
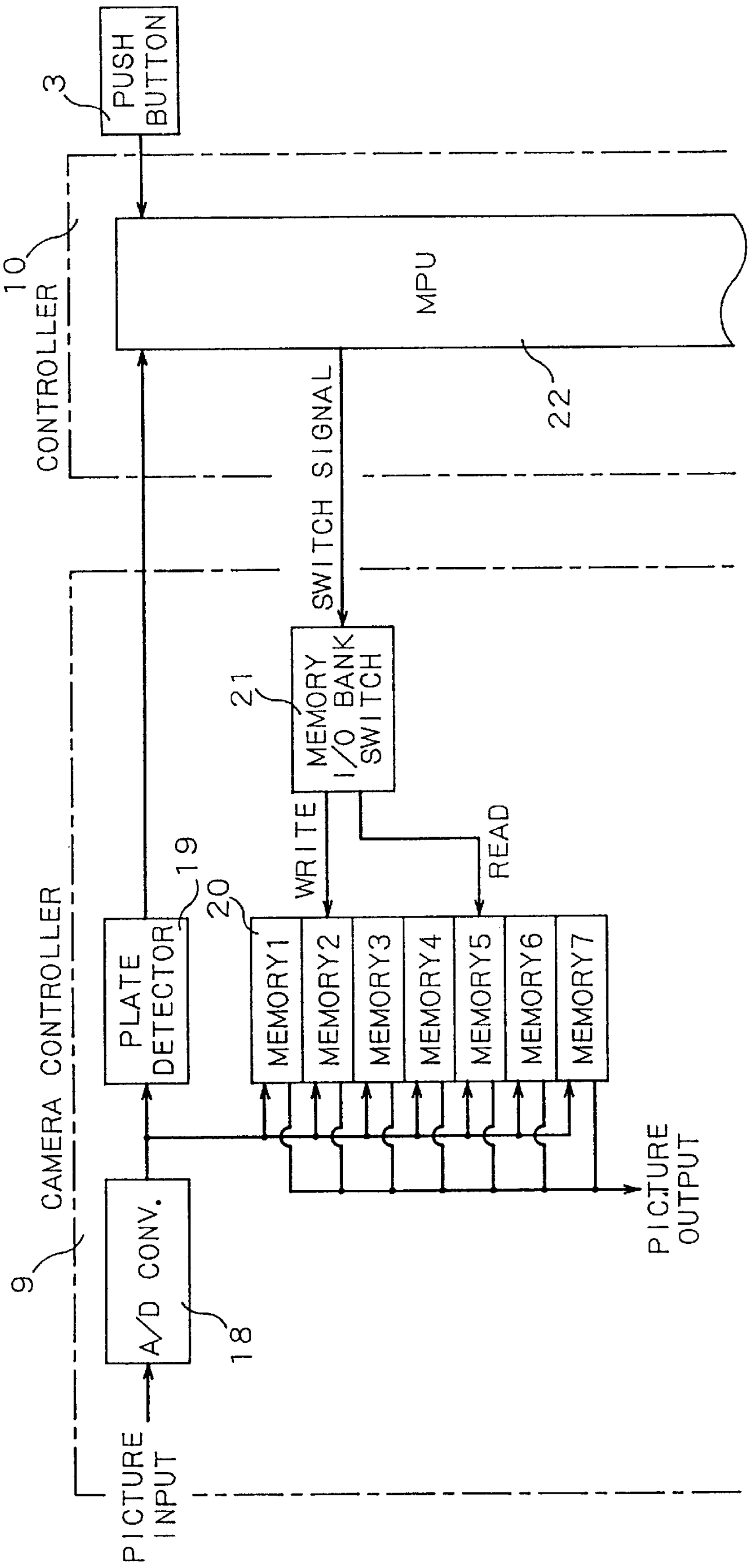
FIG. 3 is a schematic block diagram of a camera controller employed in the vehicle camera system of FIG. 2.

FIG. 3 shows a block diagram of camera controller 9 including an A/D converter 18, a license plate detector 19, a plurality of frame memories 20 as an example of a buffer memory serving a picture storage means, and a memory I/O (input and output) bank switching circuit 21. The A/D converter 18 converts a pickup signal produced by camera 6 taking a picture every 1⁄30 seconds to picture data. The license plate detector 19 detects a license plate of a vehicle based on the picture data after A/D conversion. The signal of existence or nonexistence of a license plate is applied to MPU (micro processing unit) 22 providing the controller 10.

The memory I/O bank switching circuit 21 receives a memory I/O bank switch signal generated from MPU 22, generates a write enable signal to be applied to one of frame memories 20 to write one frame of picture data of pickup signal produced from the A/D converter into the corresponding frame memory 20, and generates a read enable signal to be applied into one of frame memories 20 for reading out picture data from the applied frame memory 20. The picture image outputs from the respective frame memories 20 are applied to the picture compressor. The details will be described hereinafter.

Figure 4:
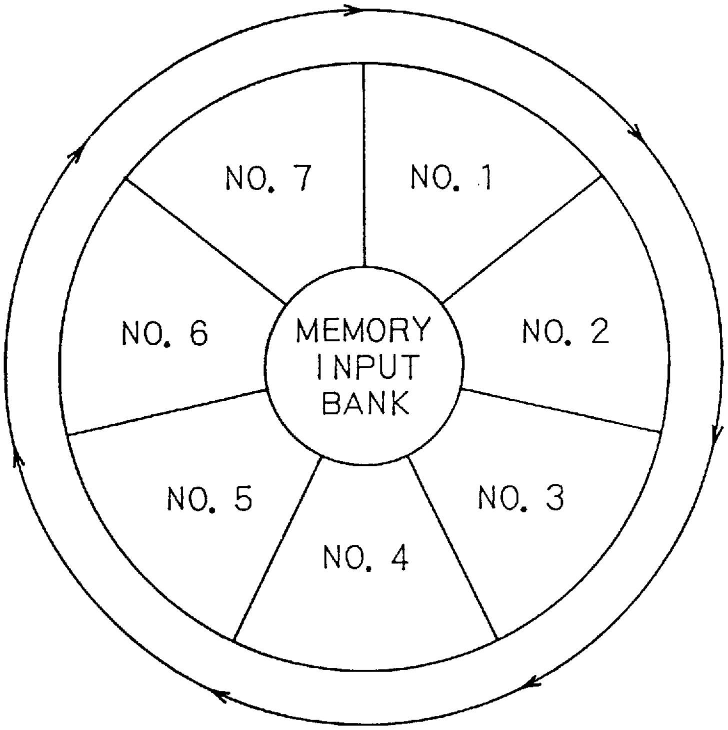
FIG. 4 is a view illustrating a circular operation for switching banks to a frame memory written with picture data.

As the MPU 22 receives the signal representing existence of a license plate from the license plate detector 19, it applies the memory I/O bank switch signal to the memory I/O bank switching circuit 21 so as to generate such a write enable signal that the frame memory 20 written with one frame of picture data is cyclically switched in a manner No. 1→No. 2→No. 3→No. 4→No. 5→No. 6→No. 7→No. 1 (see a circular motion in FIG. 4). In other words, the seven frame memories 20 (MEMORY 1 to MEMORY 7) subsequently revise the picture data temporarily stored in the respective memories from the oldest one. As the MPU 22 receives a signal representing nonexistence of any license plate, it applies a memory I/O bank switch signal to the memory I/O bank switching circuit 21 so that memory bank for the frame memory 20 to be written with picture data cannot be switched. As the MPU receives a read out instruction signal from the push button switch 3 depressed by a tollbooth attendant "m", it applies a memory I/O bank switch signal to the memory I/O bank switching circuit 21 so that picture data may be subsequently read out from one or a plurality of frame memories just before the timing of the entry of the read out instruction signal and a read enable signal may be applied to the corresponding frame memory 20. The picture data read out from the frame memories 20 are transmitted from the terminal A to the central unit B.

Figure 5:
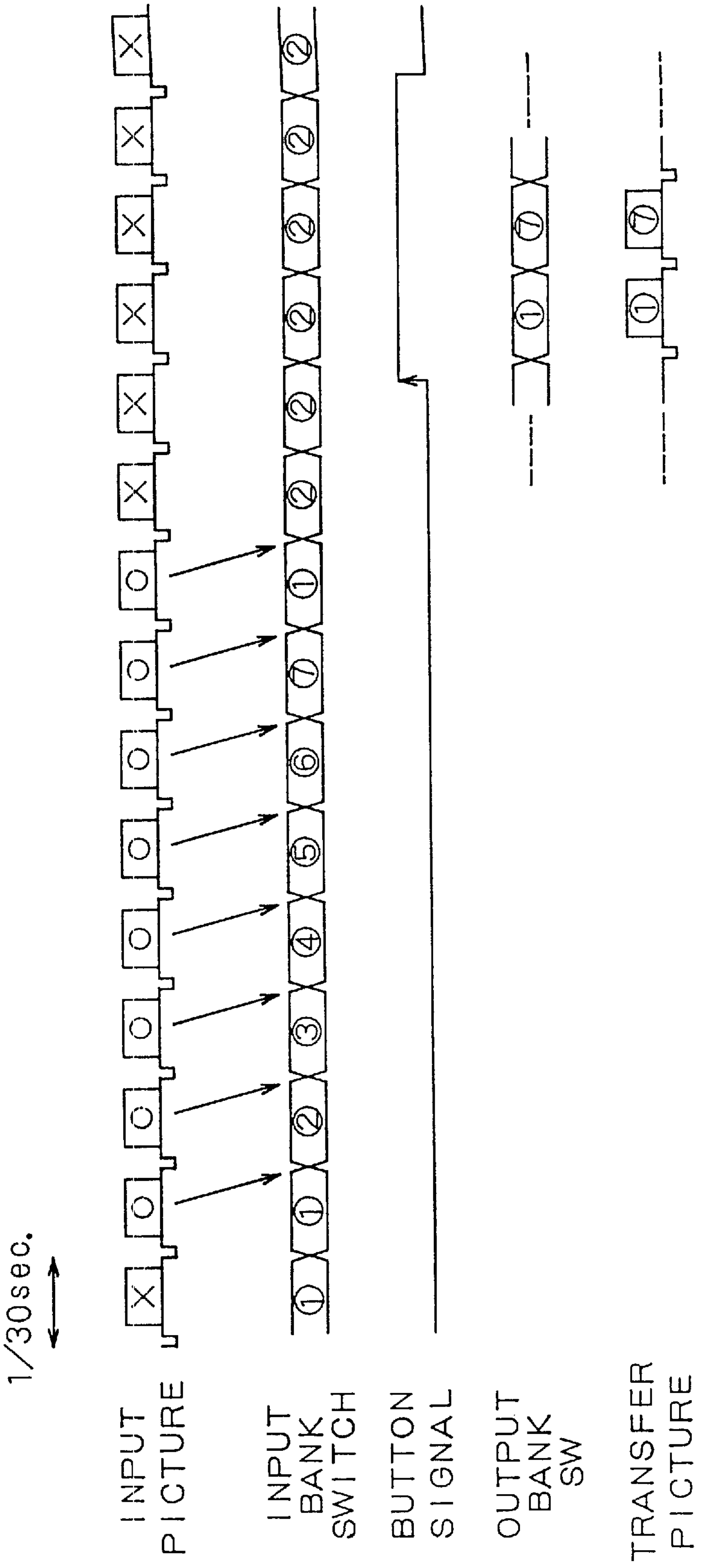
FIG. 5 is a timing chart showing a timing for storing and transferring picture data in the frame memory.

FIG. 5 shows a timing of storage and transmission of picture data about seven frame memories 20. In input picture wave form, the mark "x" represents nonexistence of a license plate while the mark "O" represents the existence of a license plate. When there is not detected the existence of a license plate, an input bank is fixed to one of them. When there is detected the existence of a license plate, the input bank is cyclically switched from No. 1 as a start point. Upon the read out instruction signal generated from the push button 3, output bank is switched from No. 1 to No. 7, in which picture data are read out from the frame memory 20 of No. 7 continuing to the frame memory 20 of No. 1 to be transmitted to the central unit B. The switching from No. 1 to No. 7 is one example. The arrow marks in FIG. 5 present switching of banks when a license plate is detected and its picture data is completely entered into the memory.

Figure 6:
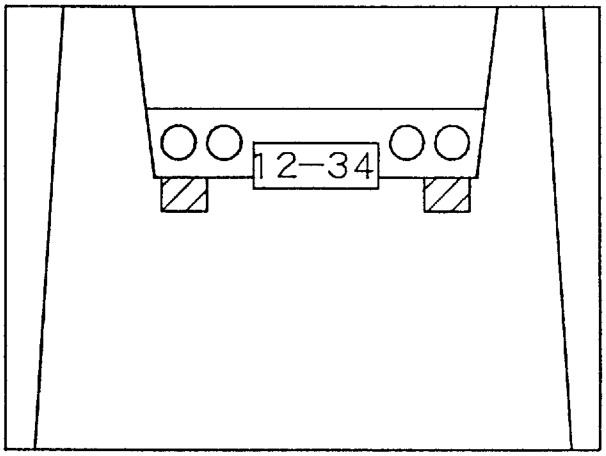
FIG. 6 is an example of a pickup image of a vehicle (an automobile) at a tollgate.
Figure 7:
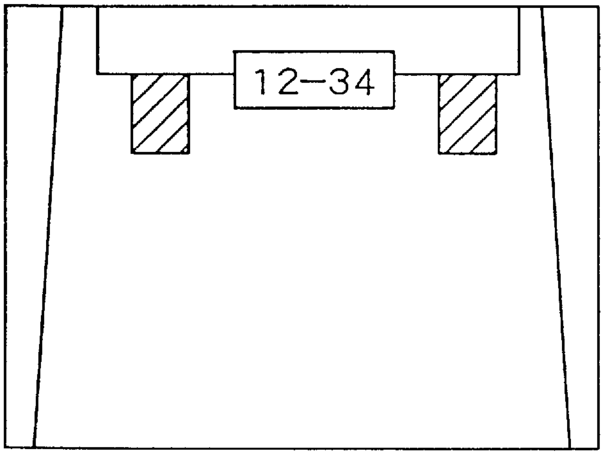
FIG. 7 is an example of a pickup image of vehicle (a truck) at a tollgate.

FIG. 6 and FIG. 7 show examples of pickup images of a vehicle at the tollgate 4, where at least a license plate is picked up but its driver is not picked up by the camera. FIG. 6 shows an example of an automobile having a hood, and FIG. 7 shows an example of a large truck. In these examples a license plate is found whereby a signal representing existence of the license plate is generated from the license plate detector 19. As the vehicle dishonestly runs away, the attendant "m" in the booth 2 is requested to depress the push button 3 but the timing of depression is apt to be delayed. The license plate of the runaway vehicle often disappears from the display prior to the timing of depression.

Accordingly, in this embodiment, picture data after detection of a license plate are revisably stored in a plurality of frame memories 20 so that picture data just before the timing of the depression of the push button 3 may be read out. Thus, even if the timing of depression of the push button 3 is delayed, it is ensured that picture including a driver together with the license plate is extracted without fail. The tollbooth attendant "m" is relieved from any over quick response work and his work load is reduced.

The visual field of the camera is designed to pick up a license plate of a vehicle stopping at a toll receiving position but to exclude pickup of a driver of the vehicle as shown in FIGS. 6 and 7. This is because a license plate of a vehicle subsequent to the runaway vehicle should not be picked up by the camera before the attendant depresses the push button after the runaway vehicle runs away. In case that the runaway vehicle stops once at a stop position to pay toll but suddenly runs away, it is ensured that the picture data of the license plate and the driver is precisely stored in the buffer memory even if the attendant "m" depresses the push button by noticing the runaway vehicle.

The camera may be so arranged that a license plate of a vehicle stopping at the stop position for paying toll is out of a visual field of the camera but the license plate comes within the visual field when the vehicle moves ahead of the stop position. In this arrangement, even if the tollbooth attendant is delayed to notice the runaway vehicle and depresses the push button after a vehicle subsequent to the runaway stops at the stop position, the picture of the license plate and the driver of the runaway vehicle is safely retrieved because it is stored in one or more of the frame memories 20.

In any event, the camera is designed to have such a visual field that when the attendant determines that a vehicle passing the tollgate has run away and depresses the push button, the buffer memory is sufficient to store at least a picture of a license plate of a runaway vehicle or preferably the license plate together with the driver of the vehicle.

Figure 8:
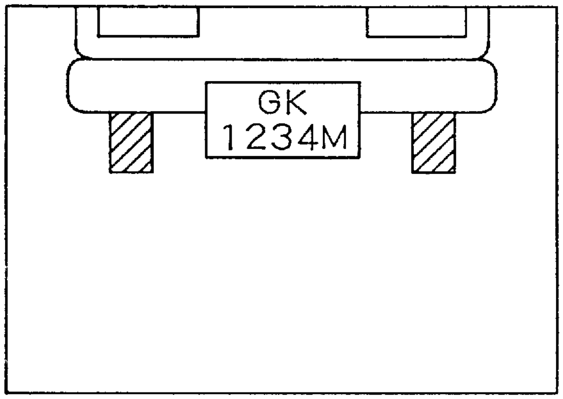
FIG. 8 shows a displayed picture of input picture data.
Figure 9:
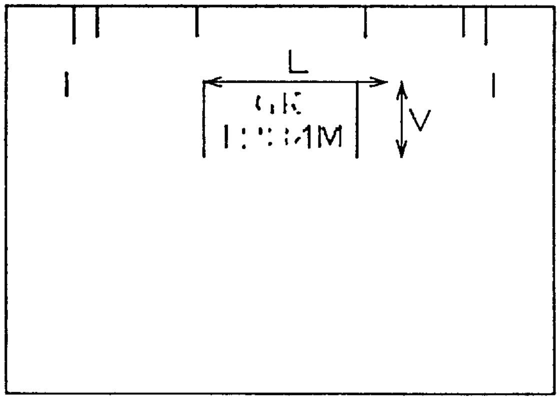
FIG. 9 shows a view illustrating a detection method of a license plate.

FIGS. 8 and 9 introduce a detection method for a license plate. Assuming that FIG. 8 shows picture data converted by the A/D converter 18 from an input picture, the input picture data is differentiated in a horizontal scanning direction and digitized to detect edges along a vertical scanning direction. This is shown in FIG. 9. A pixel where the first edge is detected becomes a start point, and a plate candidate line is made when the number of edges becomes within a predetermined range in a predetermined width L in a horizontal scanning direction. When a predetermined number of plate candidate lines continuously exist in a vertical direction V, the signal of the existence of a license plate is generated. Thus, license plates are precisely detected. Thus the obtained picture data of the license plate may be separately stored if desired.

Figure 10:
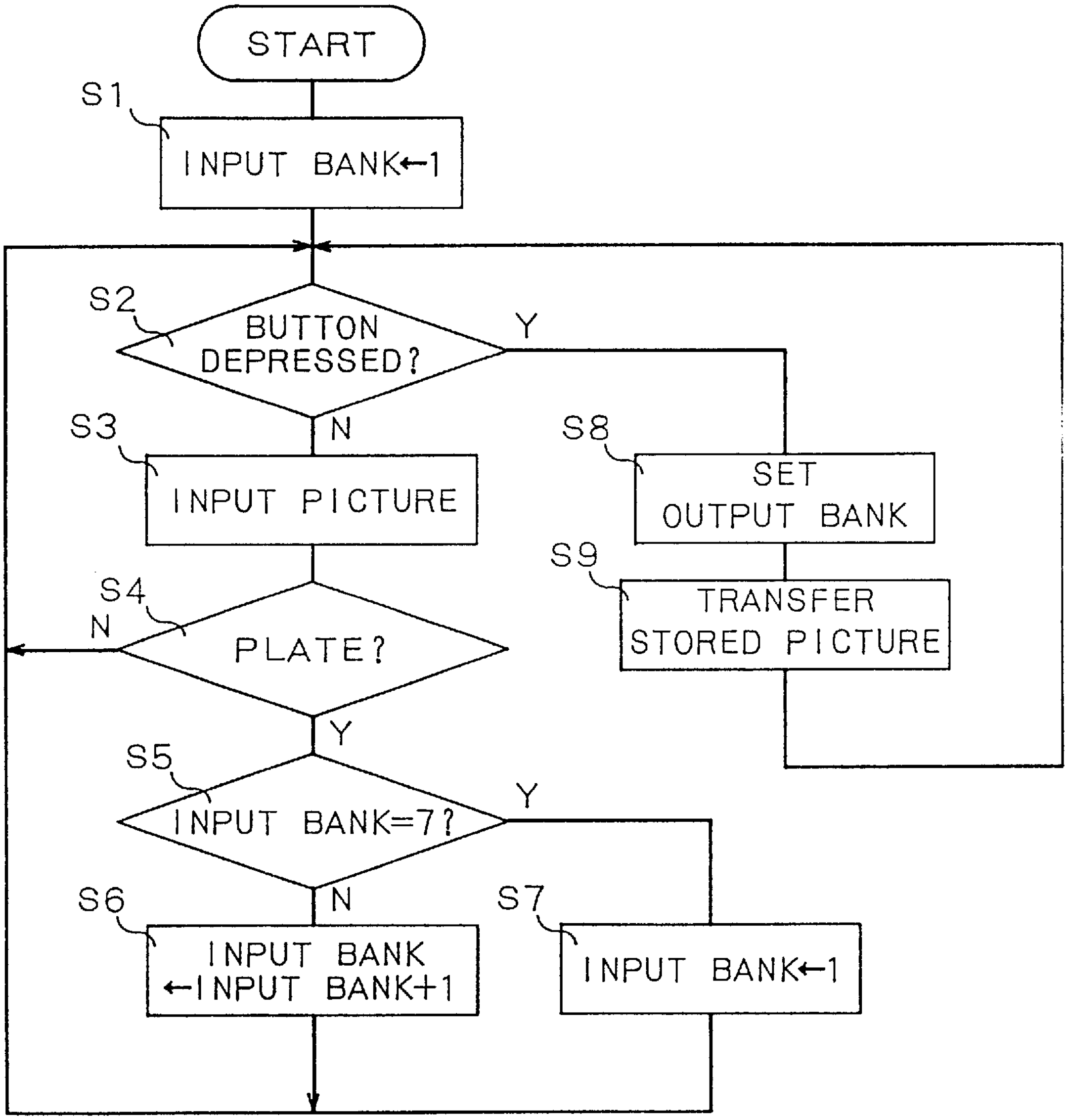
FIG. 10 is a flow chart of an operation of the vehicle camera system of FIG. 1.

FIG. 10 is a flow chart of the above-mentioned operation. In a step S1, an input bank is set to No. 1. In a step S2, it is enquired if the push button has been depressed. Unless depressed, the sequence moves to a step S3 where input picture data is temporarily stored in a frame memory 20 designated by the input bank, and an inquiry is made if any license plate has been detected in a step S4. A NO response from the step S4 returns to the step S2, but a YES response representing the detection of the license plate from the step S4 is applied to a step S5 to inquire if the input bank is No. 7. Unless the input bank is set to No. 7, a NO response is applied from the step S5 to a step S6 where the input bank is incremented by "+1". If set to No. 7, a YES response is applied to a step S7 to reset the input bank to No. 1. If the depression of the push button 3 is detected by the existence of a read out instruction signal in the step S2, the sequence moves to a step S8 to set an output bank, further moves to a step S9 where a plurality of picture data just before the input timing of the read out instruction signal are read out from their corresponding frame memories 20 to be transferred, and returns to the step S2. In the step S8, the output bank may be set to an optional number within the number of picture data stored in the frame memories 20.

The read out picture data is compressed by the picture compressor 11, and modulated by the modulator 12 to be transmitted to the central unit B through the telephone circuit or line 8. In the central unit B, the picture data demodulated by the demodulator 13 is processed by the data processor 15 to be applied to the video printer 16 to be recorded on paper and to the optical disk driver 17 to be separately stored therein. Thus the recorded picture is quite possibly includes a license plate and a driver of a runaway vehicle. The communication controller 14 is designed to control at maximum 80 circuits at a communication speed of 9600 bps.

Second Embodiment

Figure 11:
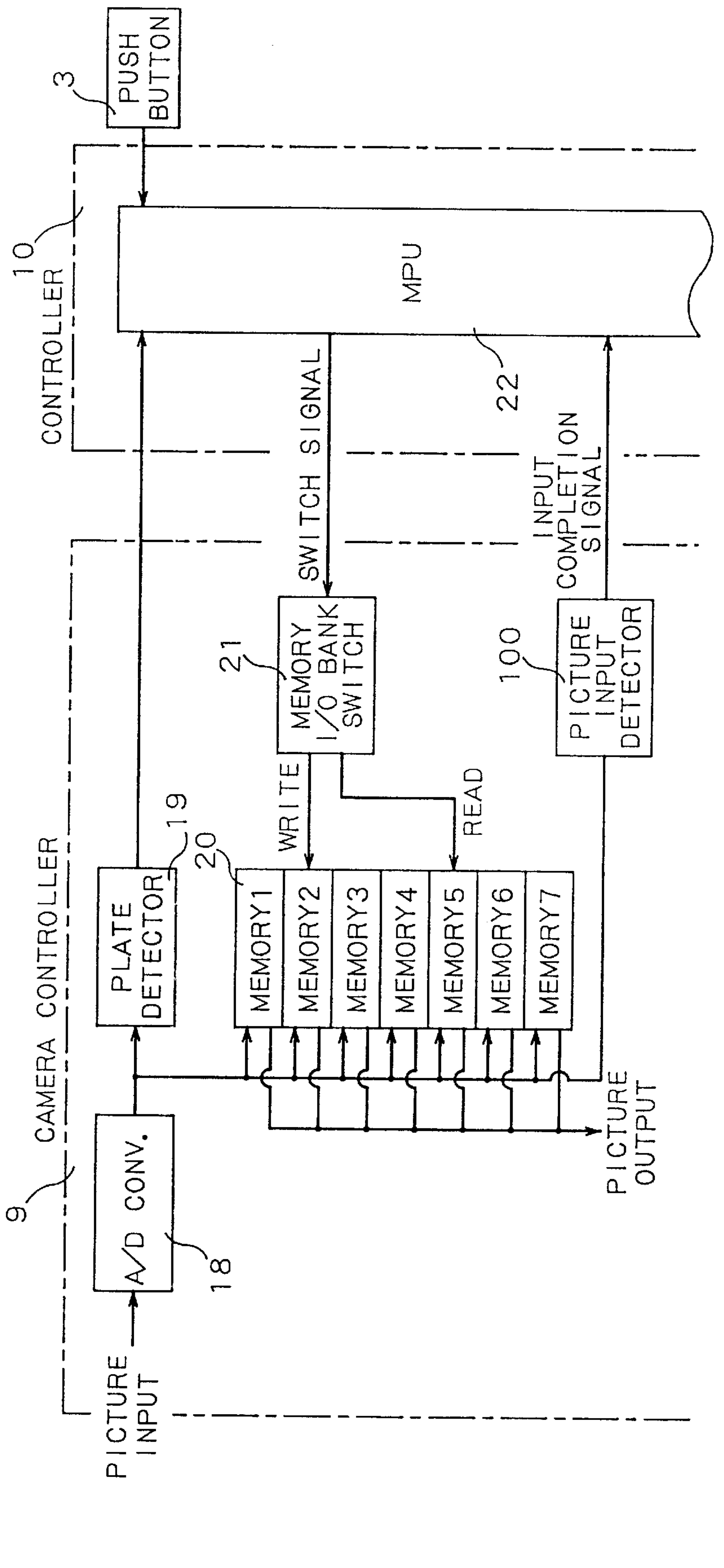
FIG. 11 is a schematic block diagram of a camera controller in a vehicle camera system as a second embodiment of this invention.

FIG. 11 is a schematic block diagram of a camera controller in a vehicle camera system as a second embodiment of this invention, in which the same components as those of FIG. 3 are represented by the same reference numerals; push button 3, camera controller 9, controller 10, A/D converter 18, license plate detector 19, frame memory 20, memory I/O bank switching circuit, and MPU 22 are employed in this embodiment.

In this embodiment all of the picture data picked up every 1/30 seconds are not processed though they are done in the first embodiment. The picture data are processed every several frame periods, three frame periods in this embodiment, so that picture data extending to a longer time period than the first embodiment are stored in the frame memories 20, viz. in an intermittent frame fashion.

Accordingly, a picture input detection circuit 100 is employed in this embodiment to detect based on a vertical synchronizing signal that the picture data from A/D converter 18 has been entered into one of frame memories 20. The MPU 22 inquires if any license plate exists every third entry of a picture input completion signal from the picture input detection circuit 100, viz., every three frame periods. If the signal of existence of a license plate is entered, the input bank is switched to store the picture data into the subsequent frame memory 20.

Though upon the entry of the signal of existence of a license plate the bank is switched every 1/30 seconds to store the picture data into the frame memories 20 in the first embodiment, the bank for the frame memories 20 in this embodiment is switched every 3/30 seconds to overwrite the picture data on the same bank until such switching.

Other components of this embodiment are the same as those of the first embodiment.

According to this embodiment, for example, the number of frame memories 20 may be increased from seven to fifty, in which picture data extending into a relatively long period such as (3/30)×50=5 seconds can be stored into the frame memories 20 in a frame intermittent fashion. Therefore, it is possible to include a state whether or not a driver of a vehicle has paid toll to the attendant "m" in the picture data stored in the frame memories 20, which is effective as evidence against a runaway vehicle.

Third Embodiment

Figure 12:
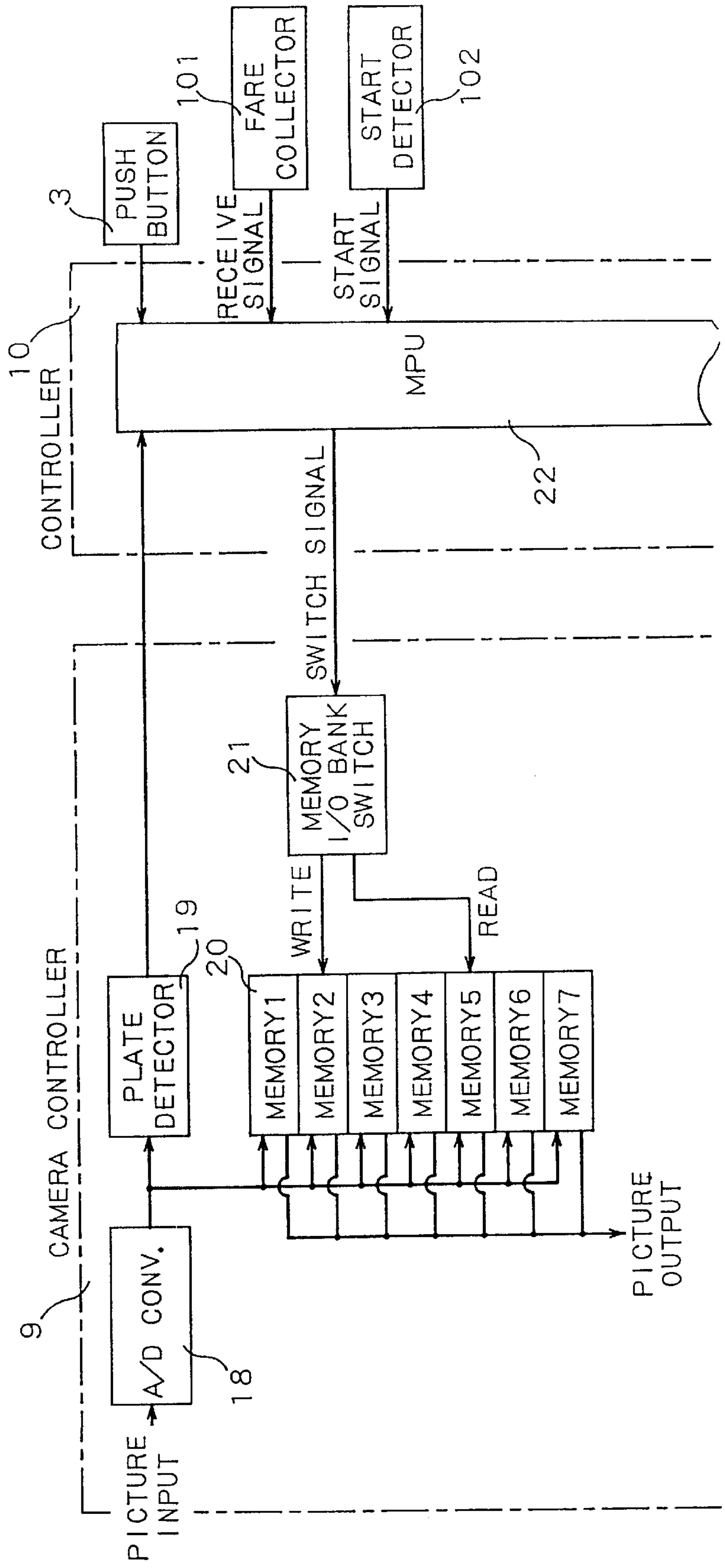
FIG. 12 is a schematic block diagram of a camera controller in a vehicle camera system as a third embodiment of this invention.

FIG. 12 is a schematic block diagram of a camera controller in a vehicle camera system as a third embodiment of this invention where the same components as those of FIG. 3 are represented by the same reference numerals.

Though picture data are read out from the frame memories 20 upon the depression of the push button 3 by the attendant "m" when a vehicle runs away without paying toll in the first and second embodiments, the system of this embodiment is designed to read out the picture data from the frame memories 20 without any depression of the push button 3 when a vehicle dishonestly runs away.

The MPU 22 determines if correct payment of toll has been done based on a receive signal produced from a fare or toll collector 101 and a vehicle start signal produced from a start detector 102 described later. When a vehicle is determined to have dishonestly run away, picture data is read out from one or a plurality of frame memories 20 just before in the same manner as the operation by the push button 3 in the foregoing embodiments. The dishonest pass vehicle detection means for detecting a vehicle dishonestly running away at the tollgate in this embodiment is composed of the toll collector 101, the start detector 102, and the MPU 22.

If correct payment about toll is made, the attendant "m" depresses a receipt key of the toll collector 101 to generate a receipt completion signal (receive signal) for application to the MPU 22.

Figure 13:
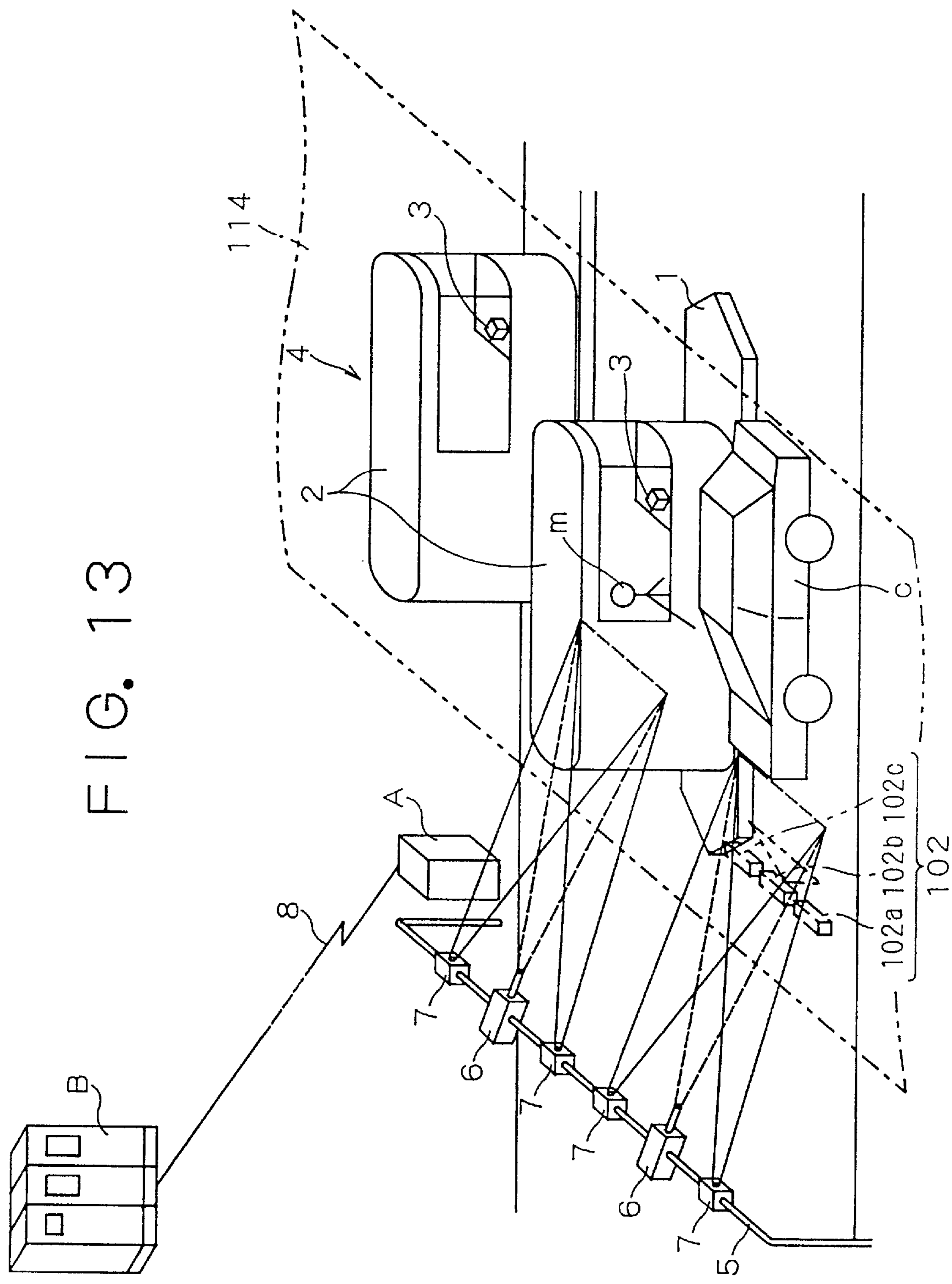
FIG. 13 is a perspective schematic view of the vehicle camera system of FIG. 12.
Figure 14:
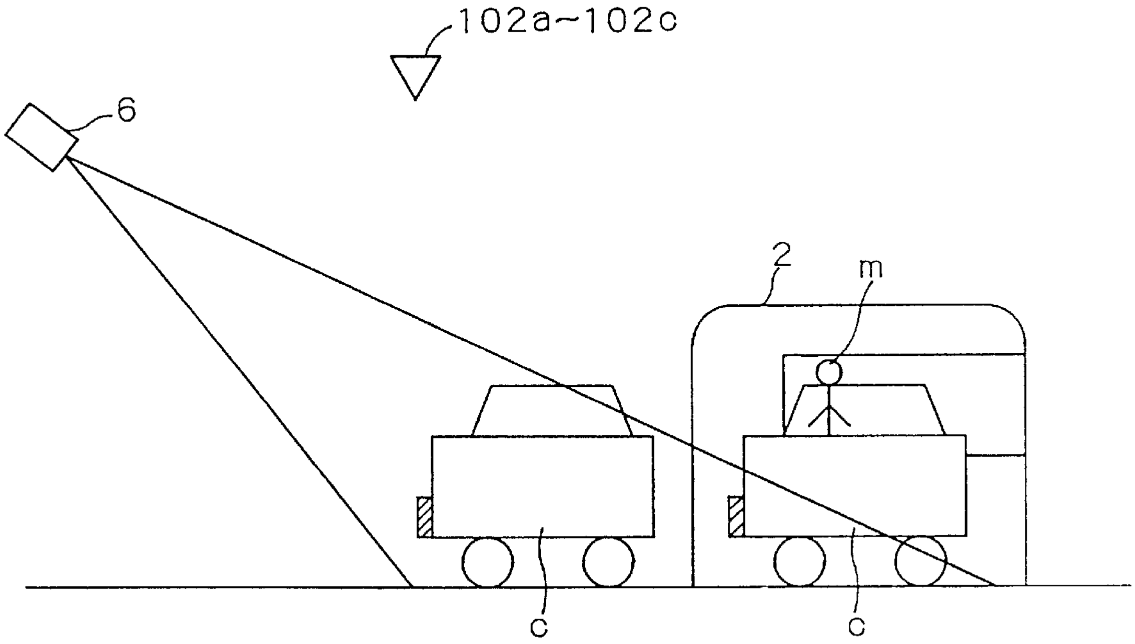
FIG. 14 is a side view of a laser beam sensor employed in the system FIG. 13.
Figure 15:
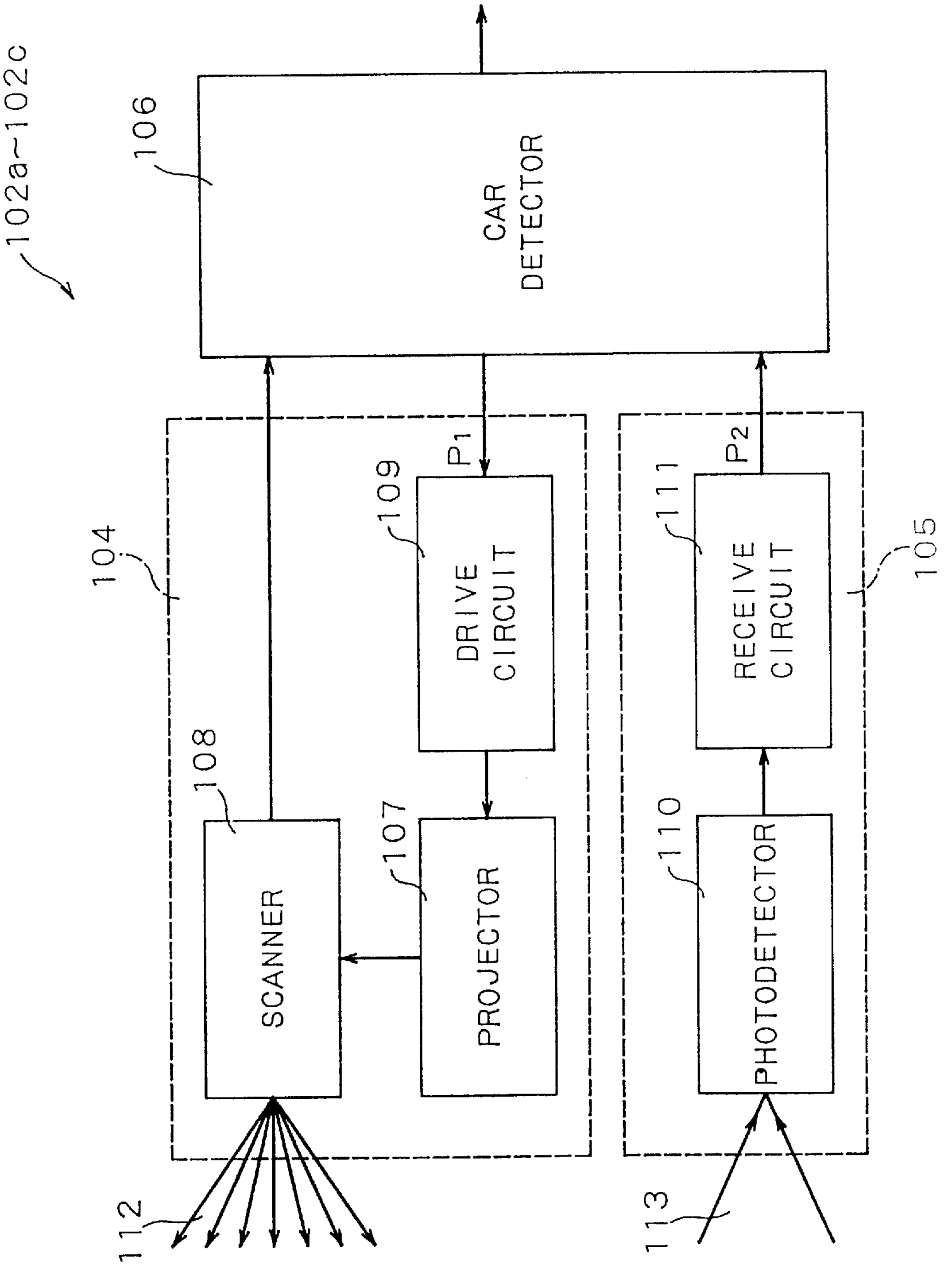
FIG. 15 is a schematic block diagram of the laser beam sensor of FIG. 14.

As shown in FIG. 13, the start detector 102 of this embodiment is composed of three laser beam sensors 102*a*, 102*b* and 102*c* which are disposed in parallel and along a width direction of the road on a roof 114 of the toll gate 4. As shown in FIGS. 13 and 14, the laser beam sensors 102*a* to 102*c* are disposed ahead of a toll payment position stopped by a vehicle "c" to detect the vehicle "c" leaving after completion of payment. In FIG. 15, each of laser beam sensors 102*a* to 102*c* includes a light projector 104 having a projector 107, a scanner 108, a drive circuit 109, a light receiver 105 having a photodetector 110 and a light receive circuit 111, and a vehicle or car detector 106.

Figure 16:
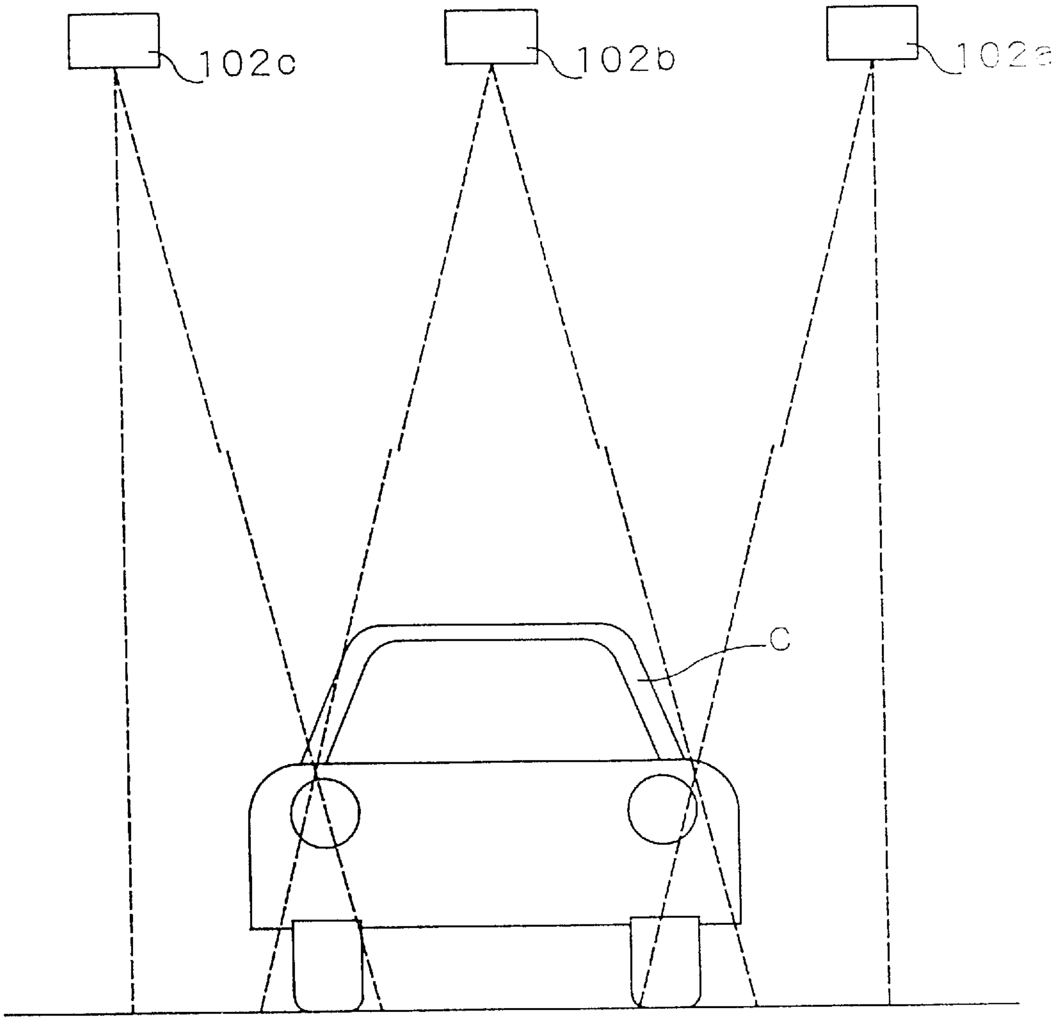
FIG. 16 shows a radiation of a laser beam of the laser beam sensor of FIG. 15.

The projector 107 of the light projector 104 employs a laser diode, and a laser beam 112 emitted from the projector 107 is scanned by the scanner 108 at a constant speed within a predetermined scanning angle to be radiated downward as shown in FIG. 16. The scanner 108 employs a reflector swingably driven by a swing mechanism to reflect the laser beam from the projector 107, but, if desired, the projector 107 itself may be directly driven by the swing mechanism.

The drive circuit 109 generates a trigger pulse signal P1 every a constant period to drive the projector 107. The photodetector 110 of the light receiver 105 employs a photodiode to convert the reflected light 113 received by the photodetector 110 into an electronic signal to be applied to the light receive circuit 111 for amplification and forming process.

The vehicle detector 106 is adapted to receive the trigger pulse signal P1 for pulse driving the projector 107, an amplified signal P2 generated from the light receive circuit 111, and a scan angle signal for the scanner 108.

The detector 106 scans the laser beam and measures a reflection time. The reflection time when a vehicle "c" exists is shorter than the time when the beam is radiated on the road. The vehicle "c" starting to move is detected based on the reflection time to apply the vehicle start signal to the MPU 22 shown in FIG. 12.

When the MPU 22 receives the payment receive signal from the toll collector 101 and the start signal from the vehicle start detector 102, any picture data is not read out from the frame memories 20 recognizing that correct payment has been executed. If the MPU 22 receives the vehicle start signal from the start detector 102 without receiving the receive signal from the toll collector 101, picture data is read out from one or a plurality of frame memories 20 just before the entry of the vehicle start signal like the actuation of the push button 3, assuming that a dishonest vehicle started to run away without correct payment of the toll. Other components of this embodiment are the same as those of the first embodiment.

According to this embodiment, as a vehicle dishonestly runs away from the tollgate, picture data is automatically read out from the frame memories 20 even if the tollbooth attendant "m" does not actuate the push button 3. The read out picture data is compressed and modulated to be transmitted to the central unit B through the telephone circuit, so that the work load of the attendant can be reduced.

The vehicle start detector 102 employs the laser beam sensors 102*a* to 102*c* so that each of a plurality of motorcycles running away in parallel can be precisely detected.

As a modification of this embodiment, the picture data may be designed to be read out from the frame memories 20 when a vehicle dishonestly running away is found based on the depression of the push button 3, the payment receive signal and the vehicle start signal. In this modification, any erroneous depression of the push button 3 itself by the attendant does not make decision of dishonest vehicle, so that erroneous operation by the attendant can be prevented. The determination of dishonesty about a vehicle is made at the position of the laser sensors after depression of the push button, whereby it is ensured that a picked up picture of the license plate and the driver of the runaway vehicle is read out.

If desired, the system of this embodiment may be so designed that the dishonesty of a vehicle is determined based on the depression of the push button 3 or the vehicle start signal from the d et ector 102 without receiving the payment receive signal from the collector 101. In this modification, the picture is read out when the push button is depressed or when the vehicle start signal is detected without receiving the payment receive signal, whichever happens earlier, so that the dishonesty of a vehicle can be determined without fail even if the attendant forget such depression of the push button. Like the second embodiment, the picture data may be processed by several frame periods.

Fourth Embodiment

Figure 17:
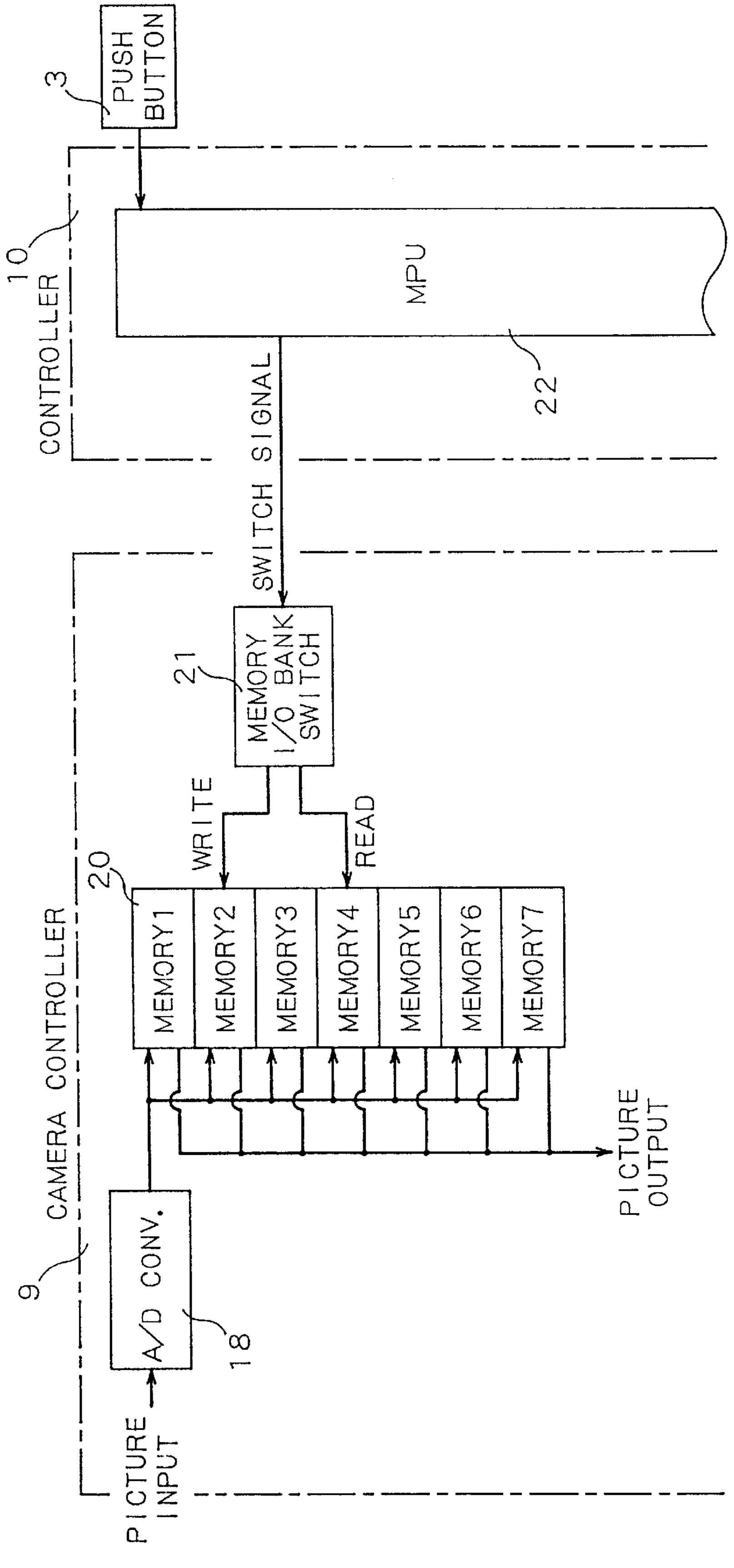
FIG. 17 is a schematic block diagram of a camera controller in a vehicle camera system as a fourth embodiment of this invention.

FIG. 17 is a schematic block diagram of a camera controller in a vehicle camera system as a fourth embodiment of this invention, where the same reference numerals are used as those of FIG. 3 because of the same components. The system of this embodiment is modified from the first embodiment by deleting the license plate detector 19 of FIG. 3. One or a plurality of picture data just before the depression of the push button 3 are transmitted without detecting any license plate.

Figure 18:
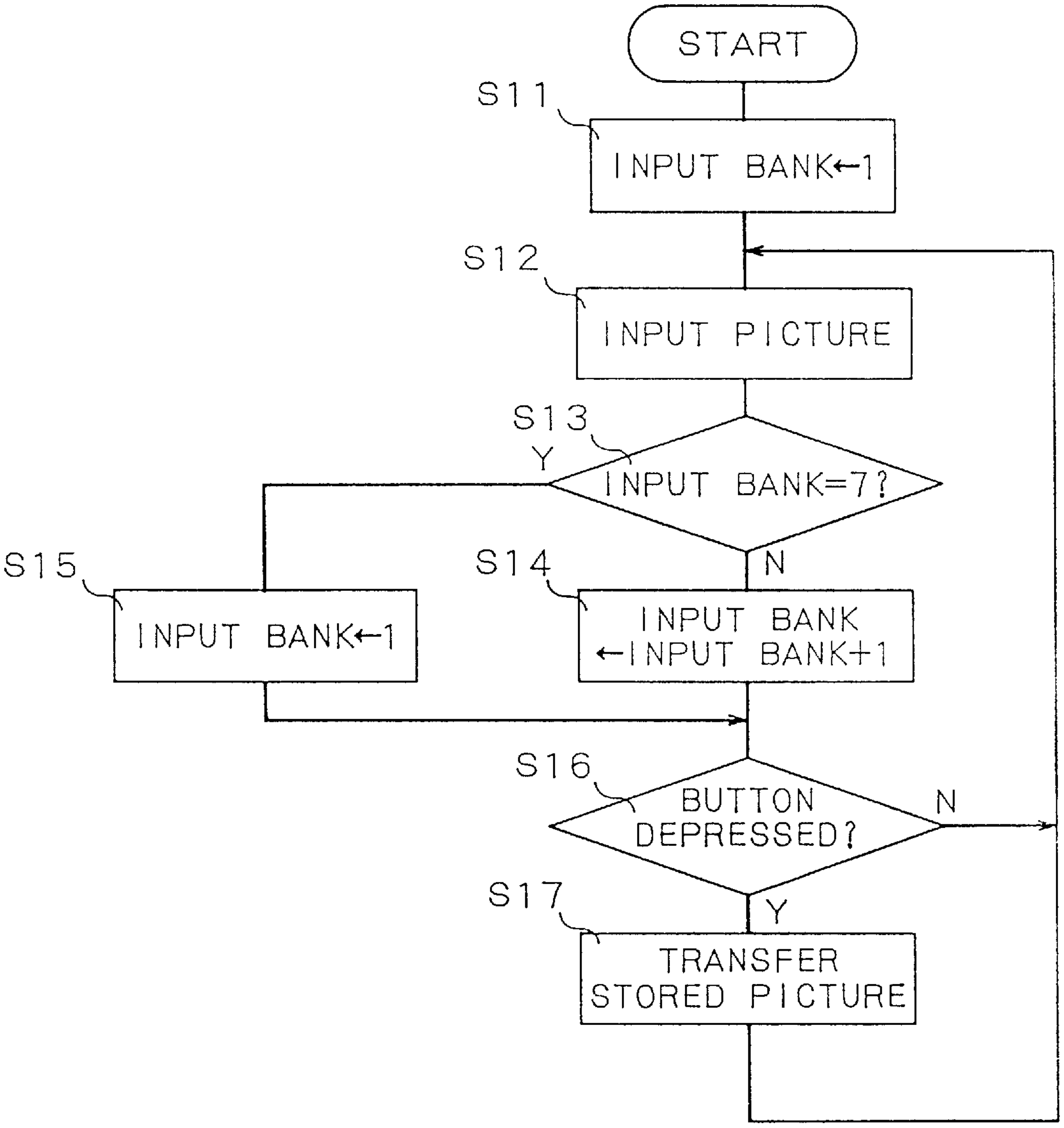
FIG. 18 is a flow chart of an operation of the vehicle camera system of FIG. 17.

FIG. 18 is a flow chart of an operation of the vehicle camera system of this embodiment. In a step S11 an input bank is set to No. 1, in a step S12 inp ut picture data is temporarily stored in the frame memory 20 designated by the input bank, and in a step S13 it is enquired if the input bank is set to No. 7. Unless set to No. 7, a NO response is applied to a step S14 where the input bank is incremented by "+1". If set to No. 7, a YES response is applied to a step S15 where the input bank is reset to No. 1. In a step S16 it is enquired if the push button 3 is depressed. If not depressed, a NO response is applied to the step S12 to temporarily store the picture data into the subsequent frame memory 20. If depressed, a YES response is applied to a step S17 to read out one or a plurality of the picture data just before the timing of the depression of the push button 3 from their corresponding frame memories 20 for transmission, and the sequence returns to the step S12.

As seen from the flow chart of FIG. 18, the banks are cyclically switched regardless of the depression on the push button to revisably store the subsequent picture data into the seven frame memories 20. Accordingly, picture data just before or after the timing of the depression of the push button 3 may be transferred.

The read out picture data are compressed and modulated to be transferred to the central unit through the telephone circuit. In the central unit, the demodulated picture data are processed to be separately recorded on the video printer and the optical disk driver.

Fifth Embodiment

Figure 19:
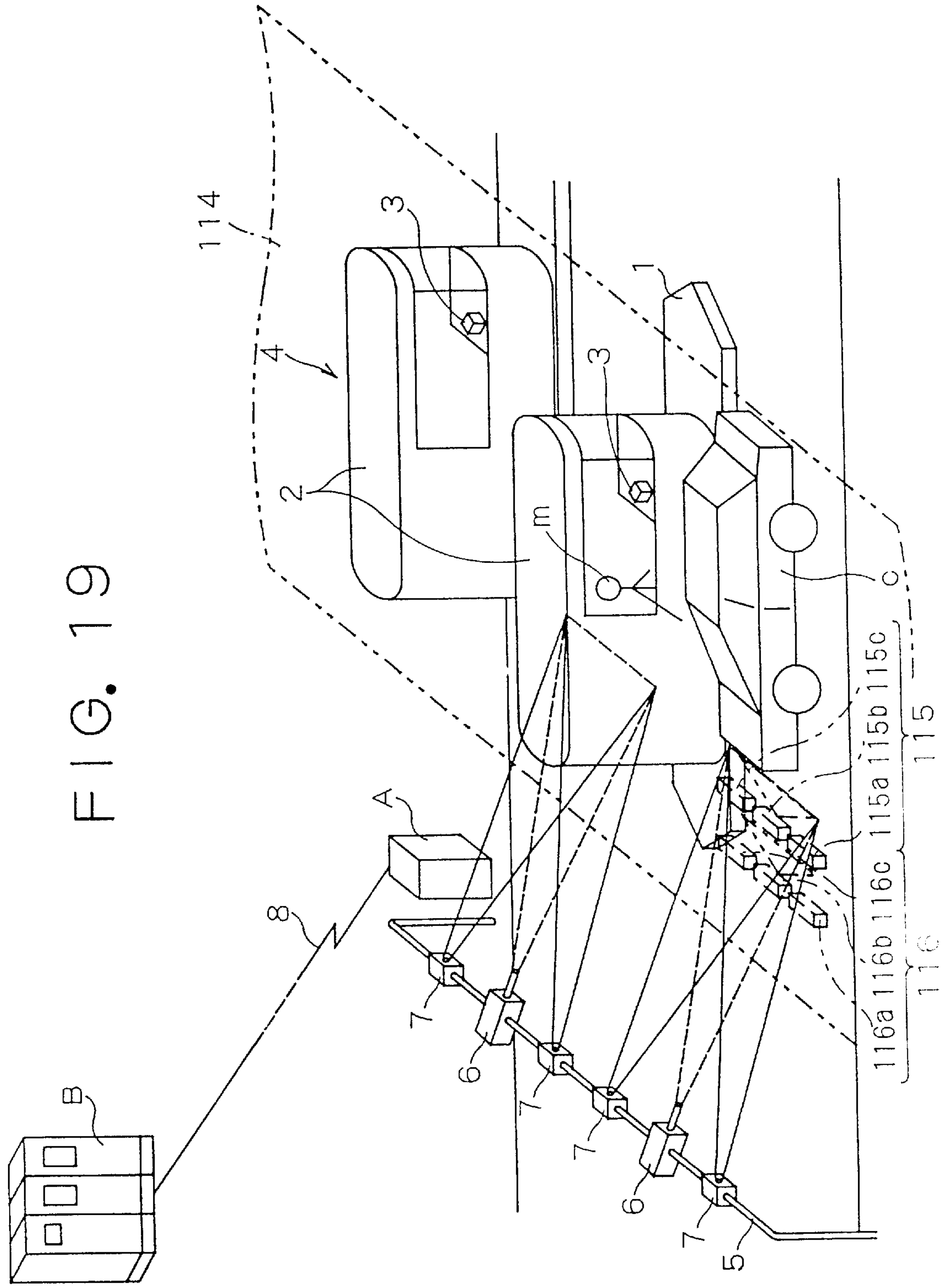
FIG. 19 is a perspective schematic view of a vehicle camera system as a fifth embodiment of this invention.
Figure 20:
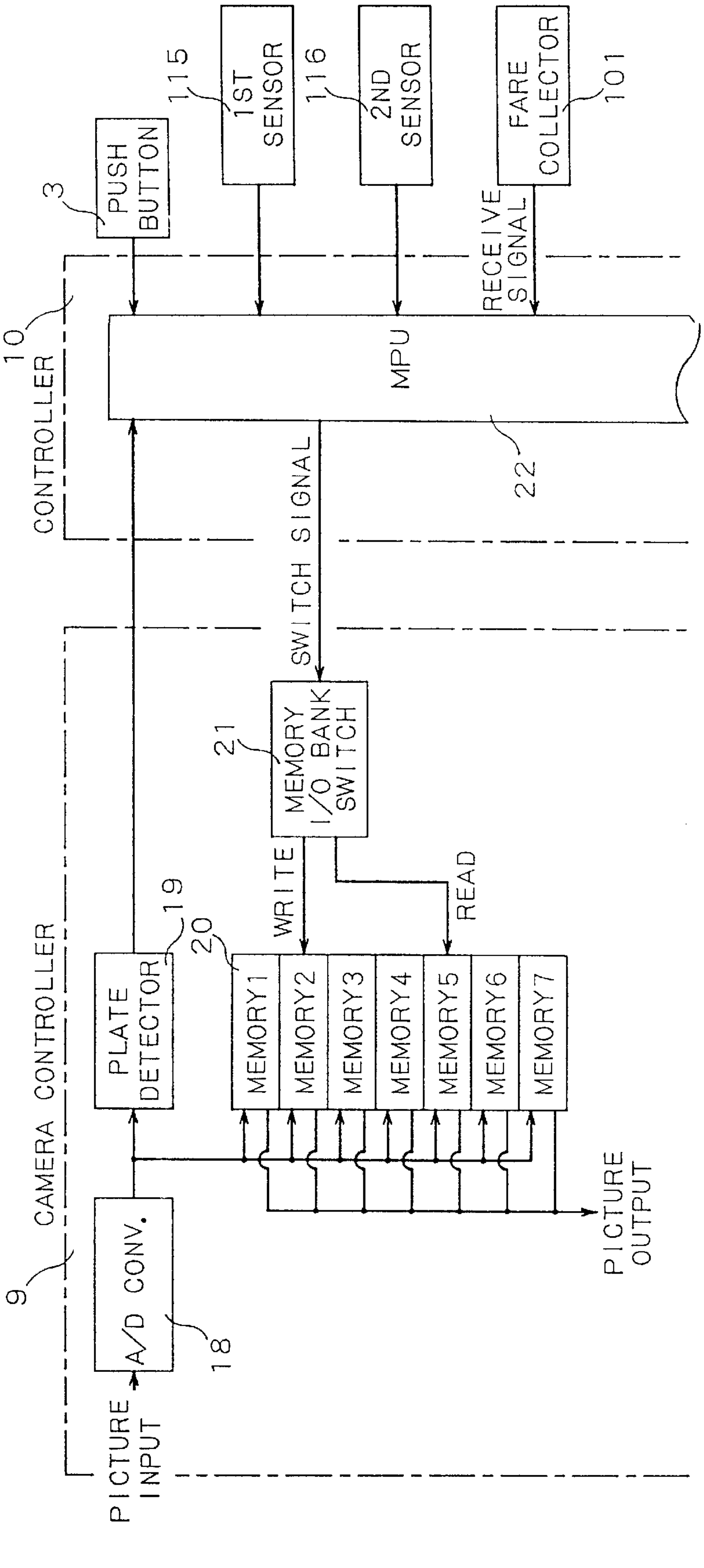
FIG. 20 is schematic block diagram of the system of FIG. 19.

FIG. 19 is a perspective schematic view of a vehicle camera system as a fifth embodiment of this invention, and FIG. 20 is schematic block diagram of a major section of the system of this embodiment, where the same reference numerals as those of FIG. 3 are used about the same components.

The system of this embodiment revises and stores picture data into the seven frame memories 20 by detecting a vehicle "c" itself without detecting a license plate thereof. This will be executed by a first laser beam sensor set 115 consisting of three sensors 115*a*, 115*b* and 115*c* and a second laser beam sensor set 116 consisting of three sensors 116*a*, 116*b* and 116*c*, which are arranged on the roof 114 of the tollgate 4. The first and second sensor sets are arranged in parallel and along a width direction of the road in the same manner as that of the third embodiment. The first sensor set 115 is disposed nearer to the stop position of a vehicle "c" for payment of toll than the second sensor set 116. Each of the first and second laser beam sensor sets 115 and 116 has a similar construction to that of the third embodiment.

Figure 21:
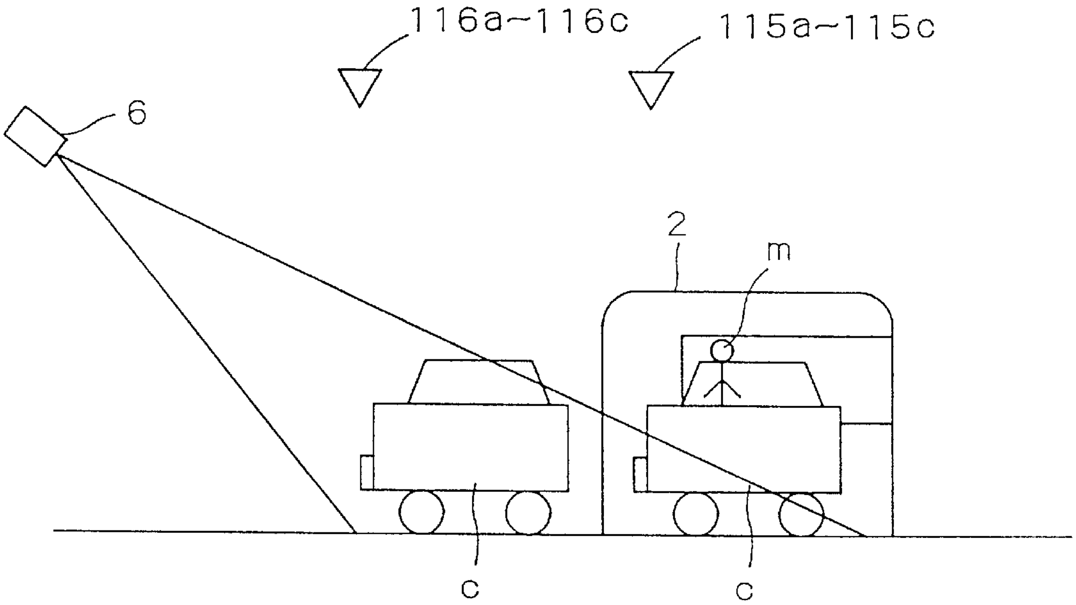
FIG. 21 is a side view of a laser beam sensor employed in the system of FIG. 19.

FIG. 21 shows an arrangement of the sensor sets 115 and 116 and the visual field of the camera 6. The first sensor set 115 is disposed to detect a vehicle "c" stopping at the toll payment position, and the second sensor set 116 is disposed to detect a vehicle "c" starting after completing payment of toll.

Figure 22:
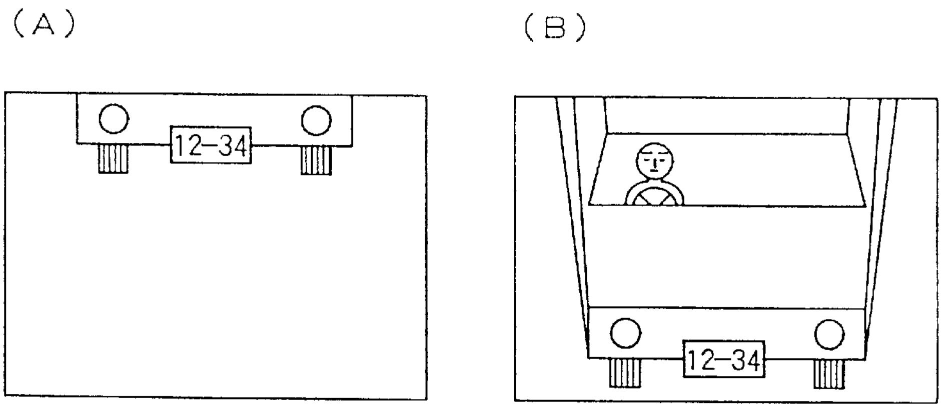
FIG. 22 shows examples of pickup images of a vehicle at a detection position of a laser beam sensor.

FIG. 22 shows pickup image when a vehicle is detected by the sensor sets 115 and 116. As shown in FIGS. 21 and 22, a license plate of the vehicle "c" enters into a pickup field of the camera 6 at a first detection point where the vehicle is detected by the first beam sensor set 115 as shown in FIG. 22-(A), and the license plate and driver of the vehicle "c" enters into the pickup field of the camera 6 at a second detection point where the vehicle is detected by the second beam sensor set 116 as shown in FIG. 22-(B). Outputs from the sensor sets 115 and 116 are applied to the MPU 22 of FIG. 20.

Figure 23:
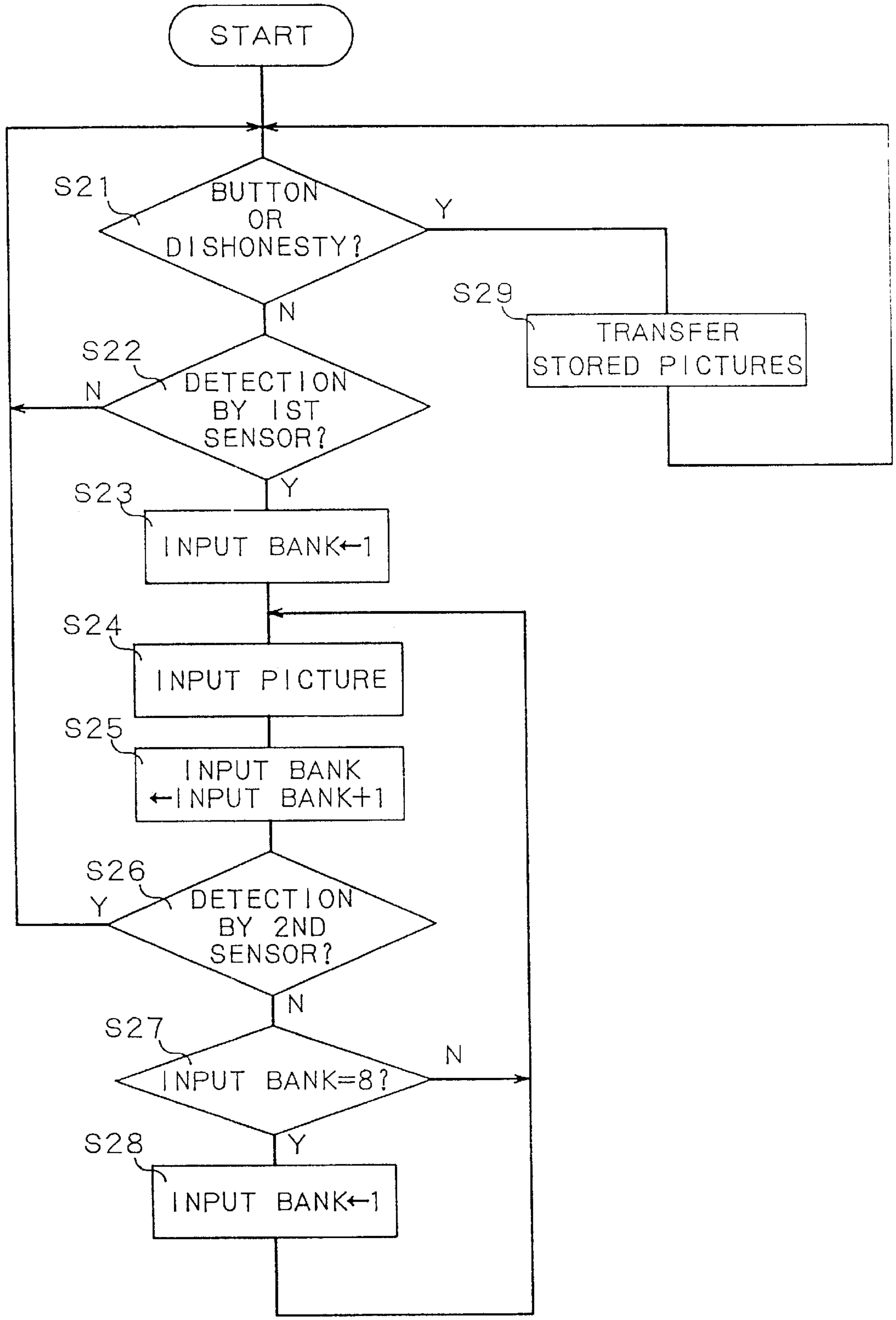
FIG. 23 is a flow chart of an operation of the vehicle camera system of FIG. 19.

FIG. 23 is a flow chart of an operation of the vehicle camera system of this embodiment. In a step S21 it is enquired if the push button 3 is depressed or the system detects dishonesty (when the payment receive signal is not generated from the fare or toll collector 101 but the second laser beam sensor set 116 generates a signal of detection of a vehicle). When the button is not depressed nor the dishonesty is not detected, a NO response is applied to a step S22 to inquire if a vehicle is detected by the first sensor set 115. When a vehicle is detected, a YES response is applied from the step S22 to a step S23 in which an input bank is set to No. 1. The sequence from the step S23 is applied to a step S24 where input picture data is temporarily stored into the frame memory 20 designated by the input bank. In a step S25 the input bank is incremented by "+1", and in a step S26 it is inquired if the vehicle is detected by the second sensor set 116. Unless detected in the step S26, it is inquired in a step S27 if the input bank is set to "8". Unless set to "8", the sequence returns to the step S24 to repeat a sequence for temporary storage of the picture data into the frame memory designated by the subsequent bank and for increment of the bank. As the input bank becomes "8", the input bank is set to No. 1 in the step S28 to return the sequence to the step S21.

Thus, during the period from the detection of a vehicle by the first sensor set 115 until the detection of the vehicle by the second sensor set 116, viz., during the detection of a license plate, picture data in succession are cyclically stored into the seven frame memories 20.

If the tollgate attendant depresses the button 3 when the vehicle passing the gate is found to be dishonest or if the detection from the second sensor set 116 is obtained without receiving the payment completion signal by the toll collector 101, a YES response in the step S21 is applied to a step S29 in which one or a plurality of picture data just before the timing of the depression of the push button 3 or the output from the second beam sensor set 116 are read out from their corresponding frame memories 20 for transmission, and the sequence returns to the step S21.

Sixth Embodiment

Figure 24:
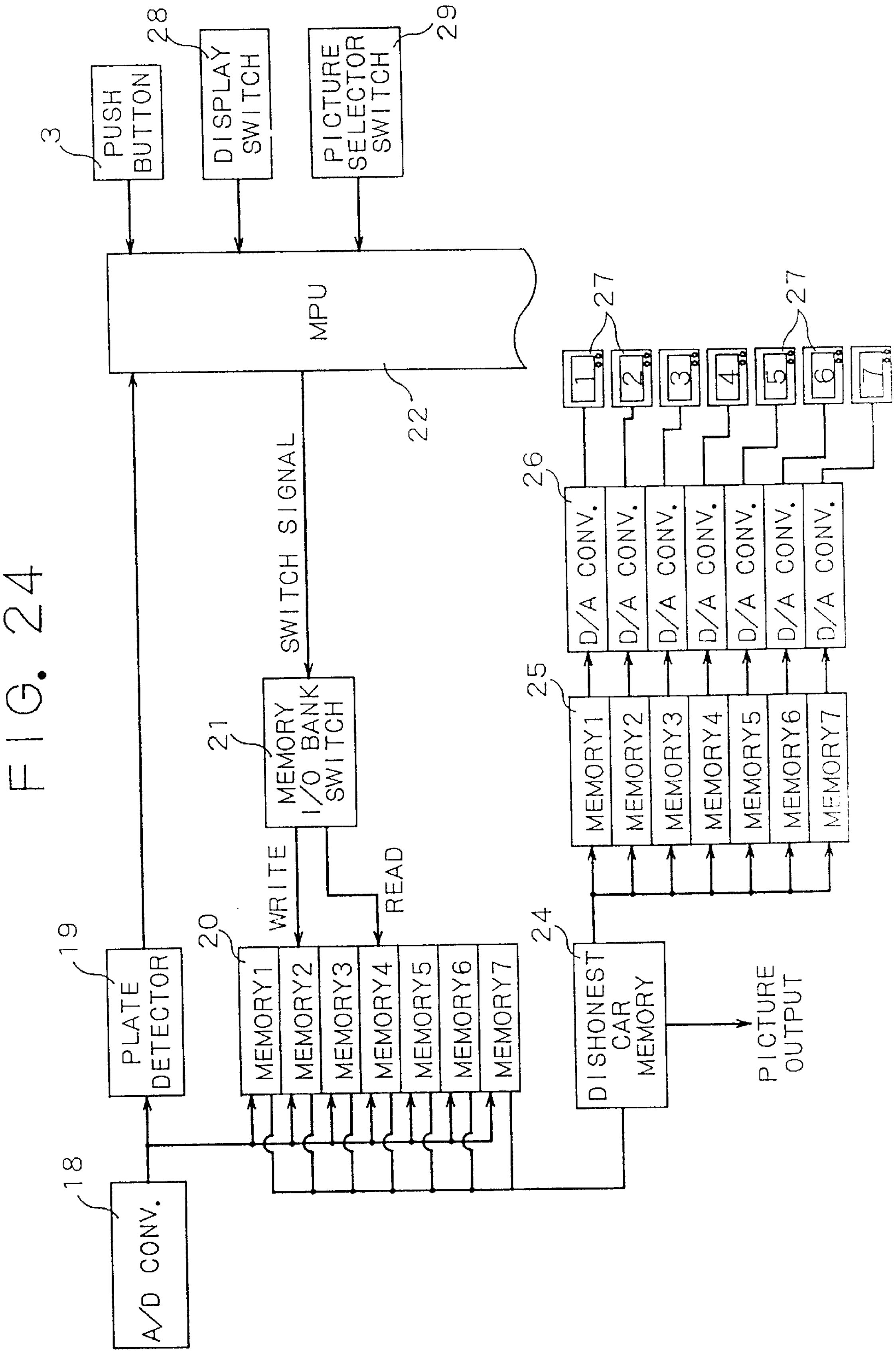
FIG. 24 is a schematic block diagram of a main section of a vehicle camera system as a sixth embodiment of this invention.

FIG. 24 is a schematic block diagram of a main section of a vehicle camera system as a sixth embodiment of this invention, which includes push button 3, A/D converter 18, license plate detector 19, seven frame memories 20, memory I/O bank switch 21, MPU 22, dishonest car picture storage memory 24, seven frame memories, 25, D/A converter 26, and monitor 27 installed within booth 2.

In this embodiment, picture data of a runaway vehicle to be transmitted to the central unit is displayed on the monitor 27 prior to the transmission so that tollbooth attendant "m" may visually confirm and select necessary picture data.

Upon the depression of the button 3, all of the picture data stored in the seven frame memories 20 are collectively transferred into the dishonest car storage memory 24 for temporary storage. This is for storing picture data of the respective dishonest vehicles which continuously appear. A necessary group (each group consists of seven frames) of picture data is read out by a display switch 28, and subsequently stored into seven frame memories 5. The picture data read out from the respective frame memories 25 are converted into analog video signals by D/A converters 26 to be displayed on the respective monitors 27.

Tollbooth attendant "m" watches the picture displayed on the monitor 27 to confirm the best picture showing a license plate and a driver, and selects one or a plurality of pictures by a picture selector switch 29 to be read out from the dishonest car picture storage memory 24 for transmission. The monitor 27 may be a single monitor having a divided display for displaying a plurality of picture data.

The pictures of all seven frames are visually checked to be selected, so that the best picture featuring a license plate, a vehicle and a driver can be precisely sent to the central unit.

Seventh Embodiment

Figure 25:
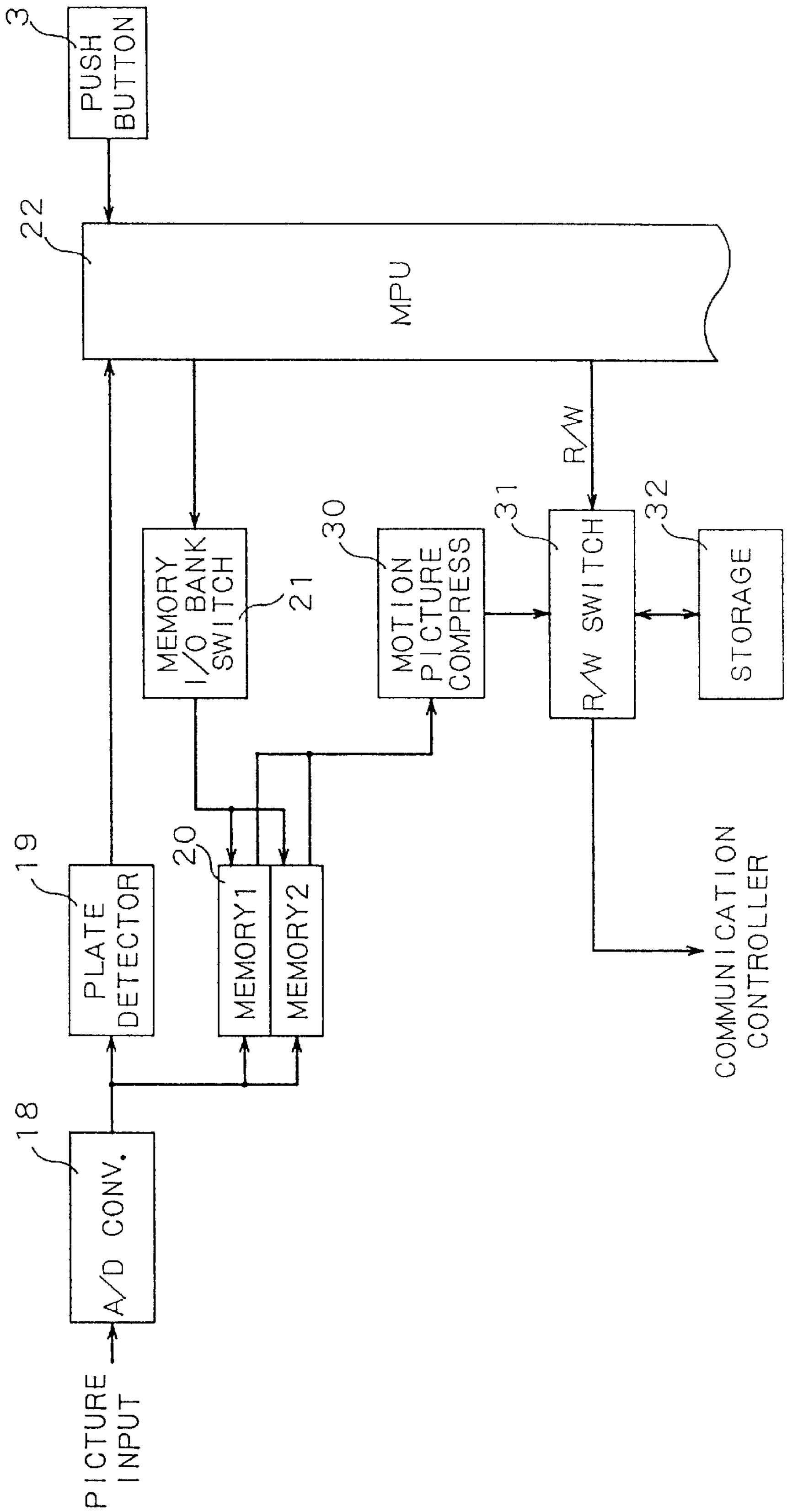
FIG. 25 is a schematic block diagram of a main section of a vehicle camera system as a seventh embodiment of this invention.

FIG. 25 is a schematic block diagram of a main section of a vehicle camera system as a seventh embodiment of this invention, which includes a push button 3, an A/D converter 18, a license plate detector 19, a pair of frame memories 20, a memory I/O bank switch circuit 21, a MPU 22, a motion picture compression unit 30, a picture write and read switch unit 31, and a mass storage 32 such as a hard disk.

This embodiment is similar to the first embodiment with respect to the construction that the frame memories are switched in accordance with existence or nonexistence of a license plate. The frame memory 20 of this embodiment, however, consists of a pair of frame memories MEMORY 1 and MEMORY 2 for simultaneous temporary storage and compression. The pair of frame memories are switched every 1/30 seconds to temporarily store input picture data. As a signal representing existence of a license plate is entered by the license plate detector 19, the picture data read from one of the pair of frame memories MEMORY 1 and 2 is compressed by a conventional compression method such as MPEG and the compressed picture data is stored into the mass storage 32 through the picture write and read switch 31. In this compression, picture data is temporarily stored in another frame memory MEMORY 2 or 1. When the storage to the mass storage 32 overflows, the oldest data are overwritten.

Figure 26:
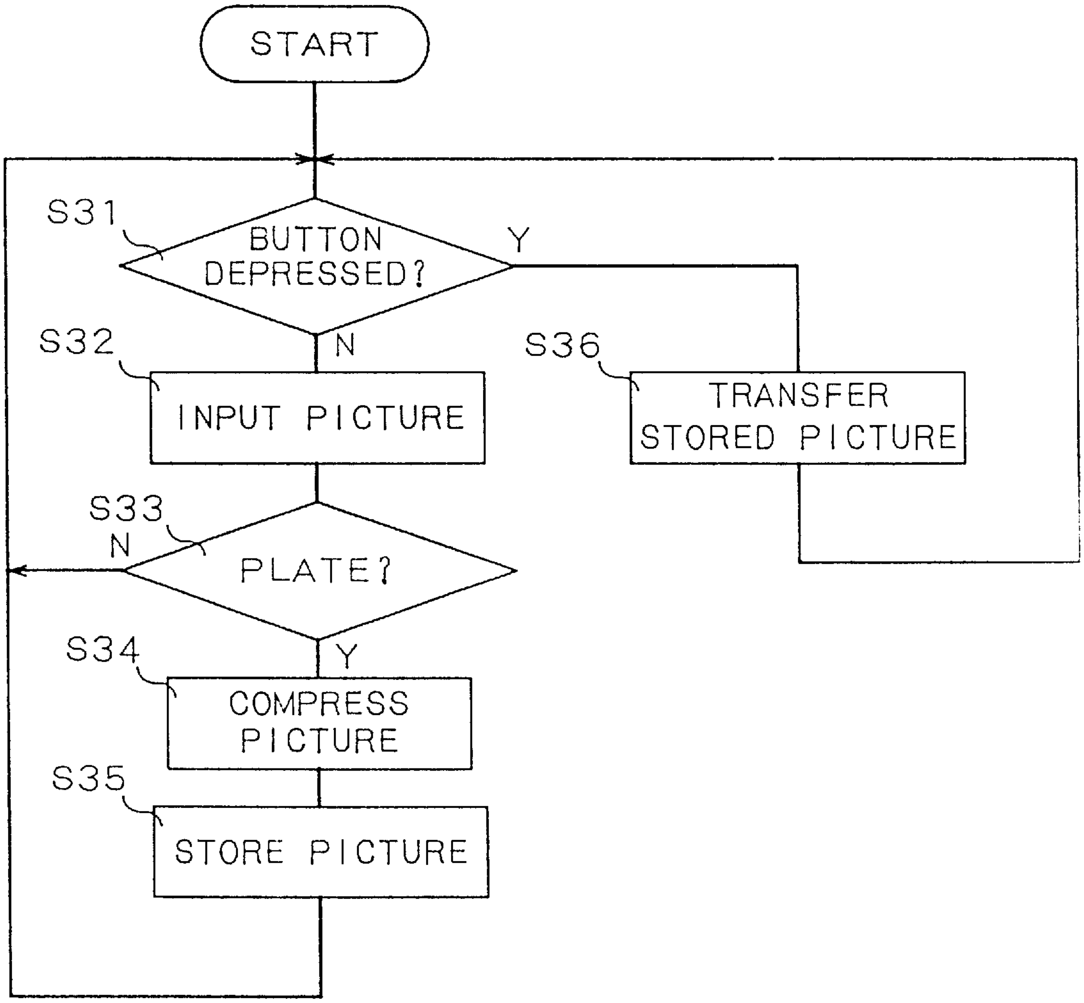
FIG. 26 is a flow chart of an operation of the vehicle camera system of FIG. 25.

FIG. 26 is a flow chart of an operation of the vehicle camera system of this seventh embodiment. In a step S31 it is enquired if the push button 3 is depressed. Unless depressed, a NO response is applied to a step S32 for temporarily storing picture data entered into one of frame memories 20 and in a step S33 it is inquired if a license plate is detected by the license plate detector 19. Unless detected in the step S33, the sequence returns to step S31. If detected, the sequence moves to a step S34 for compressing the picture data by the motion picture compression unit 30, in a step S35 the compressed picture data is subsequently stored in the mass storage 32 through the picture R/W switch 31 as a motion picture where the frame memories 20 are alternately switched, and the sequence returns to the step S31. As the push button 3 is depressed, the sequence moves from step S31 to step S36 in which a plurality of continuing picture data just before the timing of the depression are read out as a motion picture through the R/W switch 31 to be transferred to the central unit.

Eighth Embodiment

Figure 27:
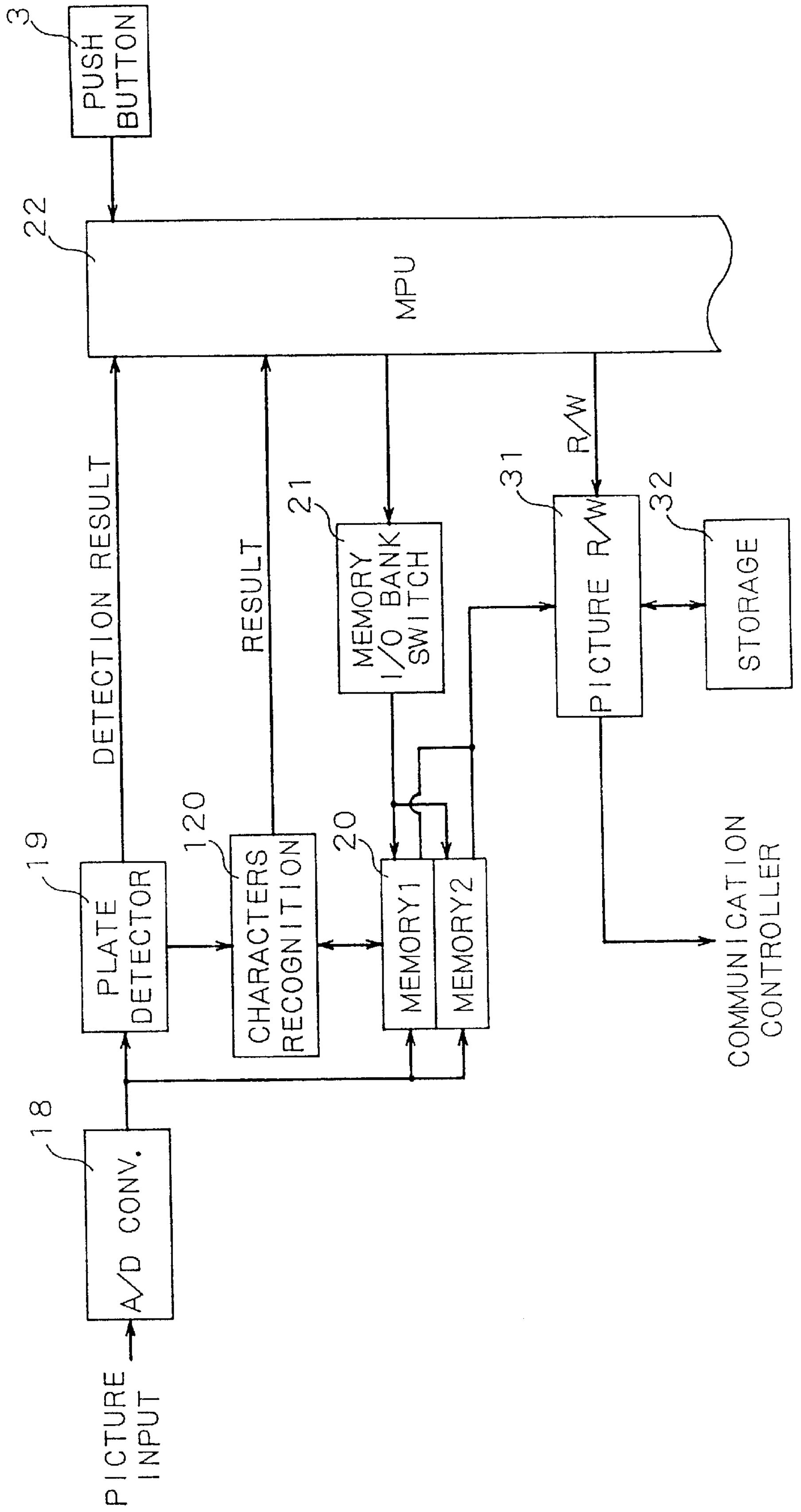
FIG. 27 is a schematic block diagram of a main section of a vehicle camera system as an eighth embodiment of this invention.

FIG. 27 is a schematic block diagram of a main section of a vehicle camera system as an eighth embodiment of this invention, in which the same components as those of the seventh embodiment are represented by the same reference numerals. In this embodiment, the motion picture compression unit 30 of the seventh embodiment is not employed, but a character recognition unit 120 is employed to recognize characters on a license plate detected by this system.

When the signal representing the existence of a license plate is entered by the license plate detector 19, characters on the license plate are recognized. As long as the recognized license plate is the same, picture data is alternately written into two frame memories 20. As the recognized license plate becomes different from the former license plate, the picked up vehicle is regarded as a subsequent vehicle and the picture data of the former license plate is stored into the mass storage through the picture R/W selector 31. If the storage to the mass storage 32 overflows, the oldest data is revised by overwriting.

Figure 28:
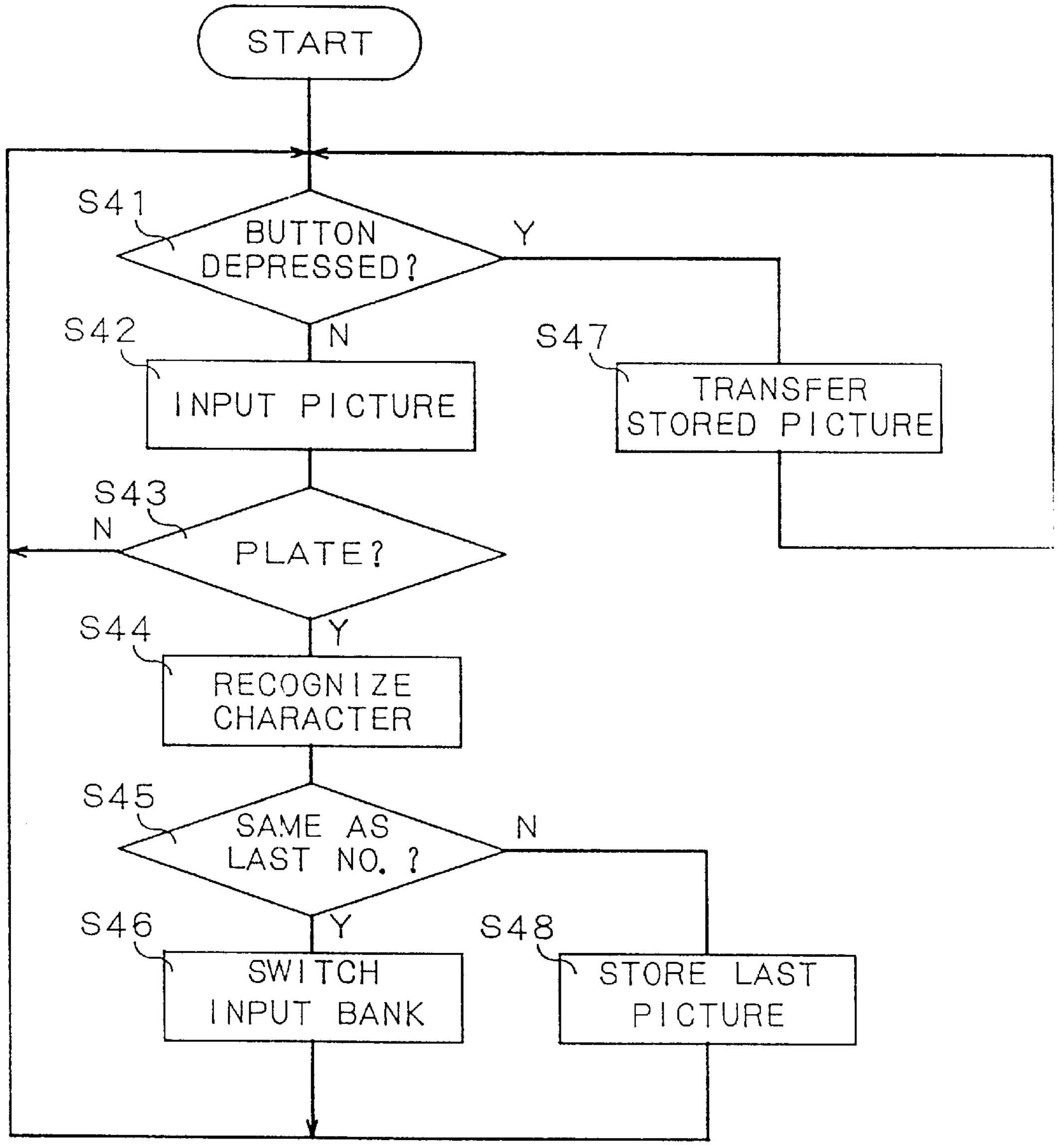
FIG. 28 is a flow chart of an operation of the vehicle camera system of FIG. 27.

FIG. 28 is a flow chart of an operation of the vehicle camera system of this embodiment. In a step S41 it is enquired if the push button 3 is depressed. Unless depressed, the sequence moves to a step S42 in which input picture data is temporarily stored into one of the frame memories 20, and in a step S43 it is enquired if a license plate of a vehicle is detected by the license plate detector 19. Unless detected in the step S43, the sequence returns to the step S41. If detected, it moves to a step S44 in which characters are recognized and in a step S45 it is enquired if the recognized characters or number is identical to those of the former license plate. If identical, in a step S46 a picture input bank of the frame memory 20 is switched to return the sequence to the step S41. Unless identical, in a step S48 the picture data of the licensed number on the former license plate is stored into the mass storage 32 through the picture R/W selector 31 and the sequence returns to the step S41. Upon the depression of the push button 3, the sequence moves from step S41 to step S47 in which the picture data just before the timing of the depression is read out through the R/W selector 31 to be transmitted to the central unit.

Ninth Embodiment

Figure 29:
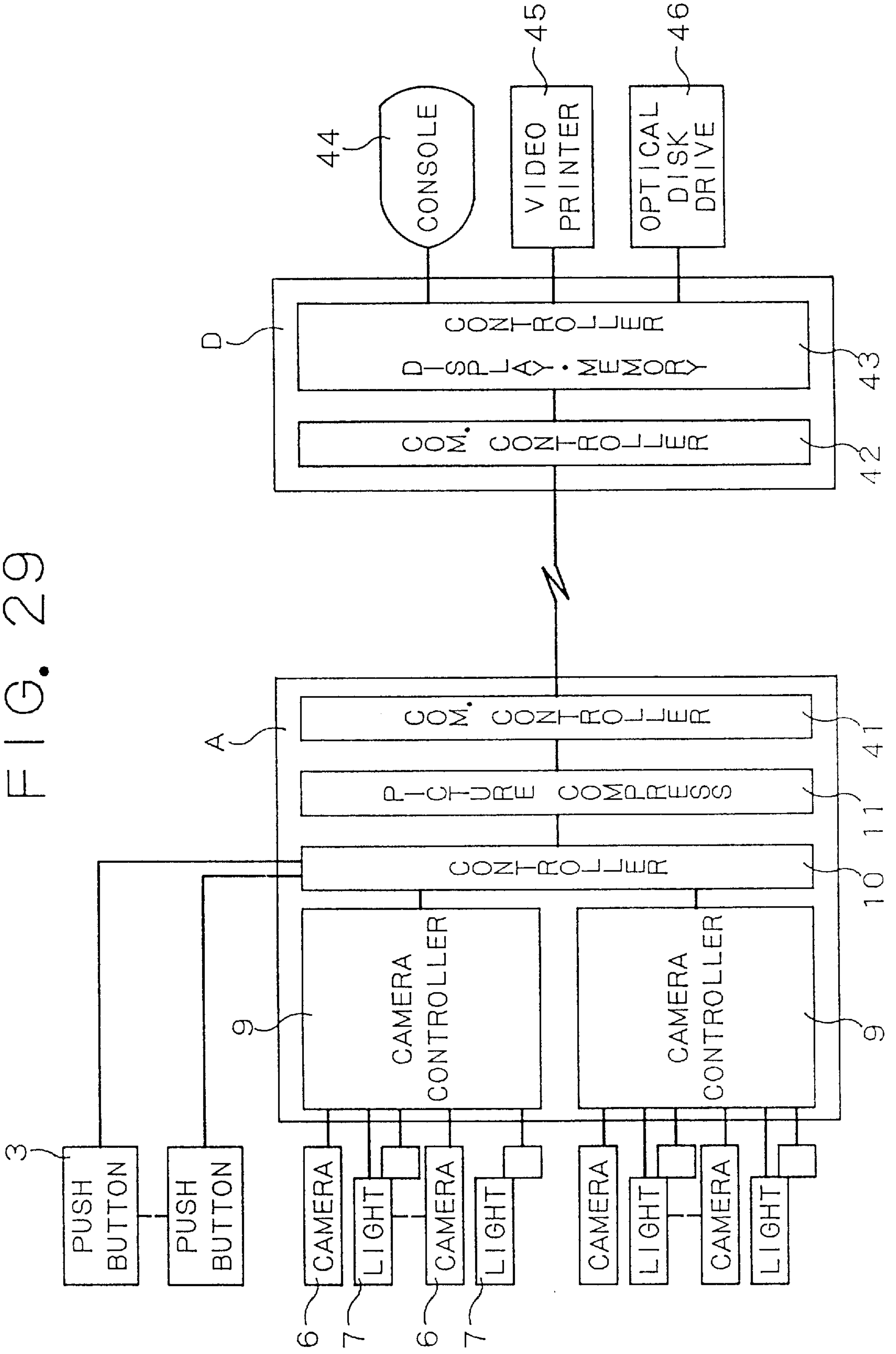
FIG. 29 is a schematic block diagram of a main section of a vehicle camera system as a ninth embodiment of this invention.

FIG. 29 is a schematic block diagram of a main section of a vehicle camera system as a ninth embodiment of this invention. In this embodiment, the picture data of a runaway vehicle is not transmitted to the central unit but the system is of a closed type to process the toll at the gate.

A terminal A installed out of doors includes a camera controller 9, a controller 10, a picture compressor 11, and a communication controller 41. An operation panel D installed within a booth of a tollgate includes a communication controller 42 and a display and memory controller 43 connected with a console 44, a video printer 45 and an optical disk drive 46.

This ninth embodiment can be applied to any of the foregoing embodiments.

Tenth Embodiment

Figure 30:
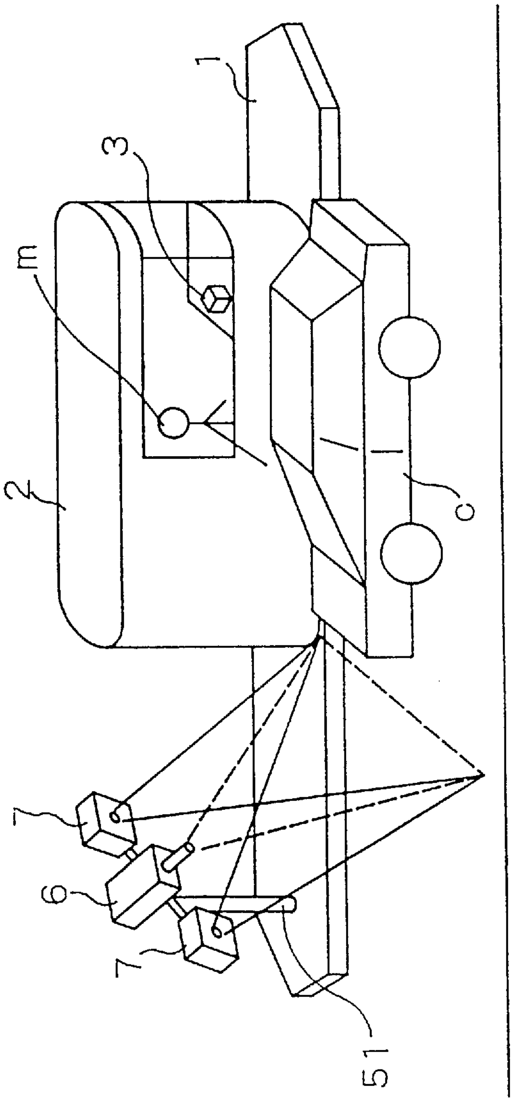
FIG. 30 is a perspective schematic view of a vehicle camera system as a tenth embodiment of this invention.

FIG. 30 is a perspective schematic view of a vehicle camera system as a tenth embodiment of this invention. On an island 1 there are disposed a booth 2 and a pole 51 mounted by a camera 6 and a pair of illuminating devices 7. The system of this embodiment is suitable to a small scale tollgate, but may be any of the foregoing embodiments.

Eleventh Embodiment

Figure 31:
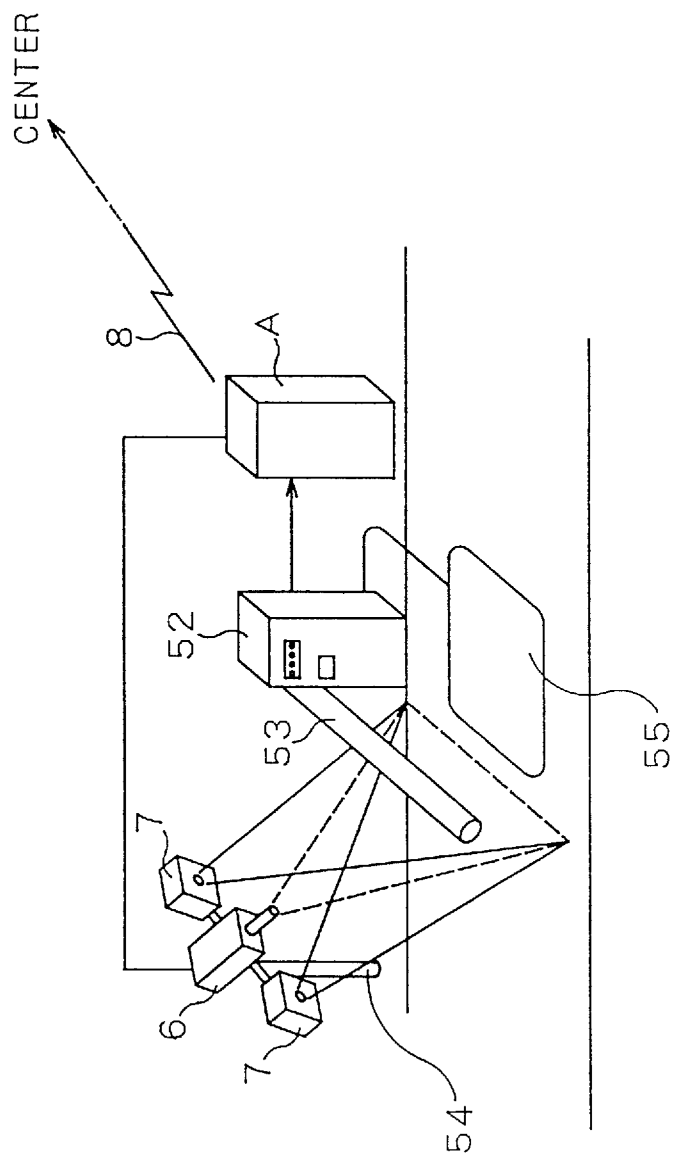
FIG. 31 is a perspective schematic view of a vehicle camera system as an eleventh embodiment of this invention.

FIG. 31 is a perspective schematic view of a vehicle camera system as an eleventh embodiment of this invention, which is applied to a fare management in a parking lot. The system of this embodiment includes a parking fee collecting machine 52 disposed beside a gate (exit) of an unmanned parking lot, a crossing bar 53 swingably mounted on the machine 52 for a open-and-close movement, and a pole 54 standing in front of the machine 52 and beside a traffic lane. The pole 54 is mounted by a camera 6 and a pair of illuminating devices 7. The camera 6 has a visual field capable of picking up a license plate of a vehicle stopping at a stop position before the crossing bar 53 as shown in FIGS. 6 and 7. The illuminating devices 7 radiate the visual field of the camera 6. A vehicle detector 55 having a loop coil is disposed at the stop position before the crossing bar 53. A terminal A is connected with the parking fee collecting machine 52 to receive a read instruction signal therefrom, and connected with a remote center unit through a telephone circuit 8 to transmit picture data of a runaway vehicle from a buffer memory (frame memory 20) to the center unit when the read instruction signal is applied to the terminal A from the machine 52.

Upon detecting a vehicle by the vehicle detector 55, the camera 6 starts to take a picture of the vehicle and the picture is temporarily stored in the buffer memory by above mentioned license plate search. When a predetermined fee is paid to the parking fee collecting machine 52, the crossing bar 53 opens for allowing the pass of a vehicle. If the vehicle detector 55 is turned to a state of no detection of any vehicle without predetermined payment, viz., without generating a payment completion signal from the machine 52, the machine 52 generates a read instruction signal (dishonest signal), and the terminal A transmits one or a plurality of picture data just before the timing to the center unit. The internal construction of the terminal A may employ any internal construction in the foregoing embodiments.

Twelfth Embodiment

Figure 32:
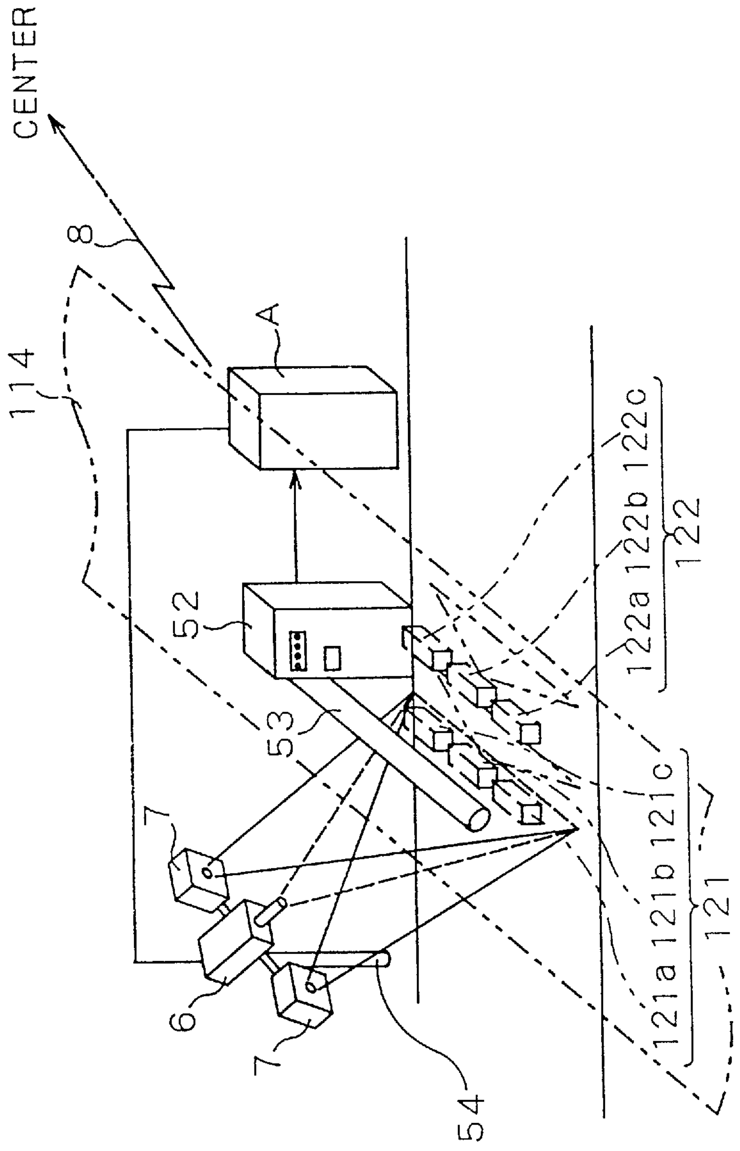
FIG. 32 is a perspective schematic view of a vehicle camera system as a twelfth embodiment of this invention.

FIG. 32 is a perspective schematic view of a vehicle camera system as a twelfth embodiment of this invention, which is applied to a parking fee management like the eleventh embodiment. The same components as those of the eleventh embodiment are represented by the same reference numerals.

In this embodiment, a pair of laser beam sensors 121 and 122 are arranged on roof 114 of a fee gate of a parking lot to detect a vehicle together with forward and backward movement of the vehicle without employing a loop coil. The laser beam sensor sets 121 and 122 have a similar construction to that of the third embodiment. The sensor sets 121 and 122 are disposed along a forward direction of a vehicle. The first beam sensor set 121 consisting of three sensors 121*a* to 121*c* is disposed near crossing bar 53. The sensor sets 121 and 122 are disposed to detect a vehicle which stops at a payment position before the crossing bar 53 for paying a parking fee.

As a vehicle comes to the gate, the second laser beam sensor set 122 consisting of three sensors 122*a* to 122*c* detects the vehicle, and the first sensor set 121 subsequently detects the vehicle. As the vehicle moves forward from the detection field, the second sensor set 122 becomes nondetection state and, thereafter, the first sensor set 121 becomes non-detection state. On the contrary, as the vehicle moves backward from the detection field, the first sensor set is turned to non-detection state, and, thereafter, the second sensor set is turned to non-detection state.

Thus, based on the change of outputs from the sensor sets 121 and 122, it is detected whether the vehicle has left the detection field by forward or backward movement.

In this embodiment, a vehicle which comes the gate to go out from the parking lot but returns without paying a parking fee, viz., which goes back from the detection field, is not regarded as a dishonest vehicle, whereby any picture data is not read out from the frame memories 20.

As the second laser beam sensor set 122 detects a vehicle, the camera 6 starts to take a picture of the vehicle and the picture is temporarily stored in the buffer memory by the above mentioned license plate search. As a predetermined fee is paid to the parking fee collecting machine 52, the crossing bar 53 opens for allowing the vehicle to pass the gate.

As the sensor sets 121 and 122 detect a vehicle at the fee payment position and the first sensor set 121 turns to nondetection state after the second sensor set 122 turns to nondetection state without payment of the fee, viz., without generating the payment completion signal from the machine 52, the machine 52 generates a read out instruction signal (dishonest signal) to be applied to the terminal A assuming that the vehicle has moved forward without paying the parking fee. Then, one or a plurality of picture data just before the timing of the read out instruction signal are transmitted from the terminal A to the center unit.

If the second laser beam sensor set 122 turns to non-detection state after the first laser beam sensor set 121 turns to non-detection state without payment of a parking fee, the vehicle is regarded that it goes back to the parking lot and any read out instruction signal is not generated. The internal construction of the terminal A may employ any internal construction in the foregoing embodiments.

Thirteenth Embodiment

Figure 33:
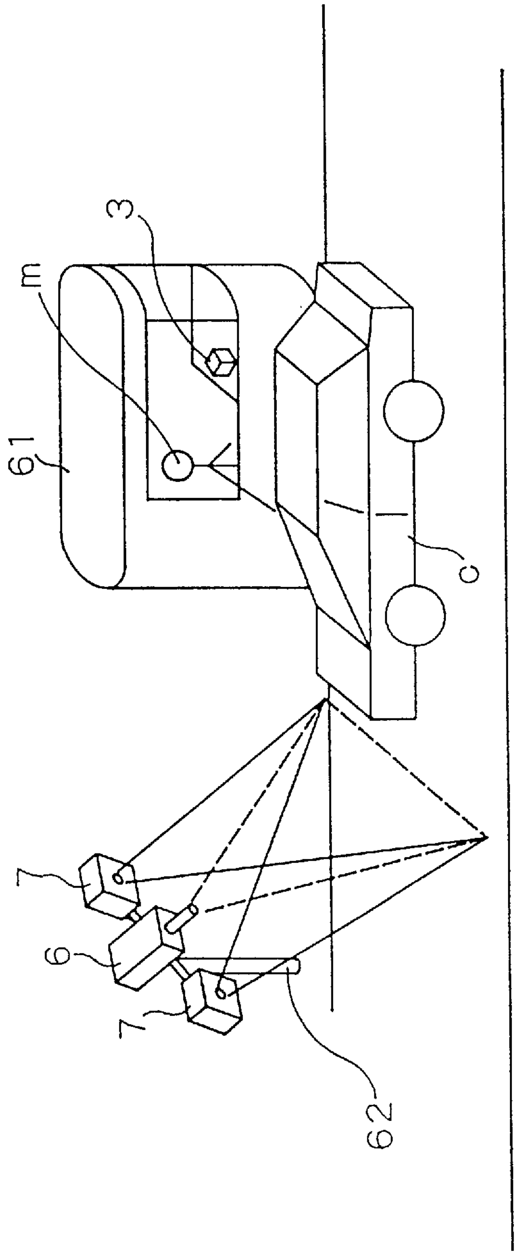
FIG. 33 is a perspective schematic view of a vehicle camera system as a thirteenth embodiment of this invention.
Figure 34:
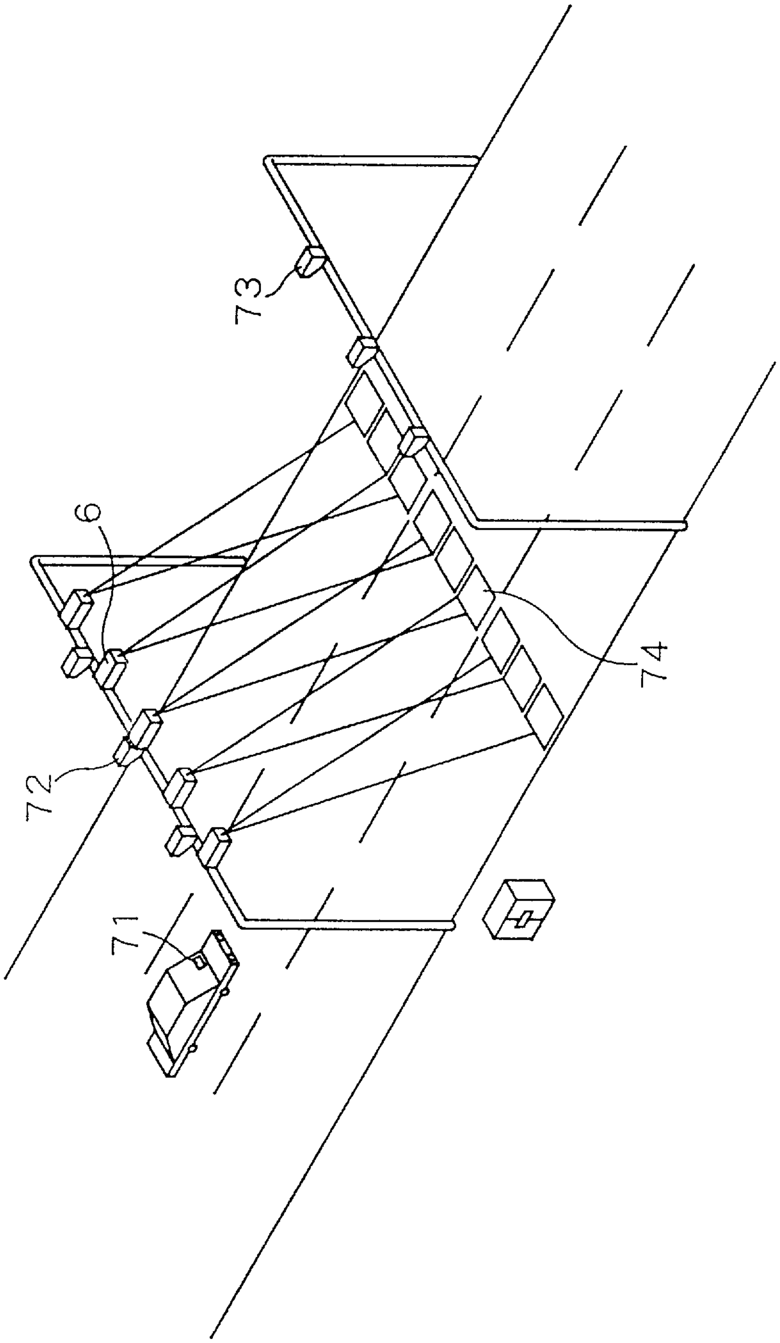
FIG. 34 is a perspective schematic view of a road pricing system as s fourteenth embodiment of this invention.

FIG. 33 is a perspective schematic view of a vehicle camera system as a thirteenth embodiment of this invention, which is applied to a manned parking lot. The system of this embodiment includes a booth 61 entered by a tollbooth attendant "m", a pole 62 standing beside a traffic lane ahead of the booth 61, and a camera 6 together with a pair of illuminating devices 7 mounted on the pole. A push button 3 to be depressed by the attendant who determines a vehicle running away is disposed within the booth 61.

In this embodiment, the camera may be arranged in the same manner as that of FIG. 30 or on the arm of FIG. 1.

Fourteenth Embodiment

FIG. 14 is a perspective schematic view of a road pricing system as s fourteenth embodiment of this invention. The road pricing system is designed to apply a charge to a vehicle entering into a city to regulate the number of vehicles in the city, and each vehicle carries a card 71 for wireless transmission of an ID code. As a first antenna 72 catches the ID code transmitted from the card 71 of a vehicle by wireless, a fee corresponding to the vehicle is charged. Writing the fee and relevant data on the card 71 takes a processing time, and a second antenna 73 confirms if the written data is correct.

If the camera picks up a vehicle at the timing of the detection of the vehicle by the vehicle detector 74, it sometimes happens that any vehicle or license plate does not exist within the visual field of the camera 6. Accordingly, upon the detection of a vehicle by the vehicle detector 74, the camera takes picture data for a predetermined time period to detect a license plate for storing a picture including the license plate as done in the foregoing embodiments. Picture data of a vehicle not having the card 71 dishonestly running the road is transmitted to a center unit.

Thus, according to a vehicle picture camera system of method of this invention, the picture data read out from the picture storage means by an operation or a motion by a tollbooth attendant who finds a runaway vehicle dishonest about toll is the picture data just before the timing of the operation or motion, so that the picture data of the runaway vehicle can be obtained without fail even if the timing of the operation is delayed and be used as a good evidence in a later toll claiming procedures. Thus, the attendant is not requested to do an over fast response and relieved from load.

By employing such a construction that picture data is read out a picture storage means in response to the detection of a dishonest vehicle by a dishonest pass vehicle detection means, the attendant can be relieved from a predetermined manual operation when any dishonest vehicle is found.

The picture storage means may employ a small capacity storage by subsequently revising and storing the oldest one of the plurality of the temporarily stored picture data. In the picture storage means including a plurality of frame memories, picture data are cyclically written into the plurality of frame memories and moved into subsequent frame memories by several frame periods so that the memory capacity can be reduced to write the picture data extending to a relatively long period, for example, a period from the payment of toll to the start of the vehicle, in an intermittent fashion.

The system in which a plurality of cameras are mounted on an arm crossing the road is suitable to a large scale gate, and the system in which a cameras is mounted on a pole standing on an island of a gate is suitable to a small scale gate.

In the system in which the picture data to be stored are visually confirmed in advance, a picture including sufficient data, preferably a license plate and a driver, for determining the person to be charged is easy to be selected and effective to store the ensured picture data.

The picture of vehicle including a license plate, preferably a license plate and a driver, can ensure determination of a person to be charged with toll or fee.

The detection of license performed by detection of edges by digital in a horizontal direction and by the existence of a number of edges being in the horizontal direction within a predetermined range and continuing in a vertical direction to a certain extent provides precise detection of the license plate.

The start of pickup by the camera based on the detection of a vehicle by a vehicle detector allows the system to have a simplified construction and easy detection in comparison with a license plate detection.

In the system including a terminal installed near a gate, a central unit installed in a building (center) remote from the gate, and a circuit (cable of wireless) connecting the terminal with the central unit, the central unit can collectively store picture data of runaway vehicles from the terminals in various points and management of later procedures is simplified. Storage of motion pictures of the runaway vehicles ensures evidence.

Thus vehicle camera system is useful in a tollgate of a toll road, a manned or unmanned parking lot, and a road pricing system.

While this invention has been described and illustrated with respect to preferred embodiments, it will be understood by those skilled in the art, after understanding the purpose of the invention, that many variations in arrangement and placement of parts may be made without departing from the spirit and scope of the invention, and it is therefore, intended in the appended claims to cover all such changes and modifications.

What is claimed is:

1. A camera system comprising:

a camera for picking up picture data, a picture storage memory for storing a plurality of said picture data picked up by said camera, a reader responsive to the entry of a read out instruction signal for reading out from said picture storage memory one or a plurality of picture data at least just before the timing of the entry of said read out instruction signal, and a read out picture storage memory for separately storing said read out picture data.

2. A camera system according to claim 1 in which said read out picture storage memory is composed of a plurality of frame memories each storing picture data for one frame.

3. A camera system comprising:

a camera for picking up picture data, a picture storage memory for storing a plurality of said picture data picked up by said camera, a reader responsive to the entry of a read out instruction signal for reading out from said picture storage memory one or a plurality of picture data at least just before the timing of the entry of said read out instruction signal, and a read out picture storage memory for separately storing said read out picture data, said read out picture storage memory being adapted to subsequently revise and store the oldest one of the read out picture data.

4. A vehicle camera system according to claim 3, in which said picture storage memory is composed of plurality of frame memories each storing picture data for one frame.

5. A camera system comprising:

camera for picking up picture data, a picture storage memory consisting of a plurality of frame memories each storing said picture data picked up by said camera for one frame, a reader responsive to the entry of a read out instruction signal for reading out from said picture storage memory one or a plurality of picture data at least just before the timing of the entry of said read out instruction signal, a read out picture storage memory for separately storing said read out picture data, and a write instructor for applying a cyclic writing instruction of picture data to the plurality of frame memories, said write instructor being adapted to apply a writing instruction to a subsequent frame memory at several frame periods.

6. A vehicle camera system comprising:

a camera for picking up a vehicle passing a gate, a picture storage memory for storing a plurality of picture data picked up by said camera, a dishonest vehicle detector for detecting a vehicle dishonestly passing said gate, a reader responsive to the detection of said dishonestly passing vehicle by said dishonest vehicle detector for reading out from said picture storage memory one or a plurality of picture data at least just before the timing of said detection, and a read out picture storage memory for separately storing said read out picture data.

7. A vehicle camera system comprising:

a camera for picking up a vehicle passing a gate, a buffer memory for storing a plurality of picture data picked up by said camera, a reader responsive to the entry of a read out instruction signal for reading out from said buffer memory one or a plurality of picture data at least just before the timing of the entry of said read out instruction signal, and a read out picture storage memory for separately storing said read out picture data.

8. A vehicle camera system according to claim 7, in which said buffer memory is composed of a plurality of frame memories each storing picture data for one frame.

9. A vehicle camera system according to claim 7, in which said camera is disposed on a road ahead of said gate.

10. A vehicle camera system according to claim 7, in which said camera is mounted on an arm crossing a road of said gate.

11. A vehicle camera system according to claim 7, in which said camera is mounted on a pole standing on an island of said gate.

12. A vehicle camera system according to claim 7, in which said camera has a view range capable of picking up at least a license plate of a vehicle which stops at a stop position of said gate, and at least the license plate and a driver of the vehicle which is positioned at a forward position of said stop position.

13. A vehicle camera system according to claim 7, further comprising a vehicle detector for detecting a vehicle passing said gate and a writing instructor for instructing writing picture data on said buffer memory.

14. A vehicle camera system according to claim 7, further comprising:

a detector for detecting that a vehicle passing the gate has arrived at a first detection point and a second detection point, and an instructor for instructing said buffer memory to write picture data from a time when the vehicle reaches said first detection point until a time when the vehicle reaches said second detection point, said camera being able to pick up at least a license plate of the vehicle at said first detection point and a license plate and a driver of the vehicle at said second detection point.

15. A vehicle camera system according to claim 7, in which said gate is disposed at a tollgate of a toll road.

16. A vehicle camera system according to claim 7, in which said gate is disposed in a parking lot.

17. A vehicle camera system according to claim 7, further comprising a monitor for displaying a plurality of picture data read out from said buffer memory, and a selector switch for selecting which picture data should be separately stored from the plurality of said displayed picture data.

18. A vehicle camera system according to claim 17, further comprising a dishonest vehicle picture storage memory for storing all of the plurality of picture data, said monitor displaying picture data stored in said dishonest vehicle picture storage memory.

19. A vehicle camera system comprising:

a camera for picking up picture data of a vehicle passing a gate, a buffer memory for storing a plurality of picture data picked up by said camera, a reader responsive to the entry of a read out instruction signal for reading out one or a plurality of picture data from said buffer memory at least just before the timing of the entry of said read out instruction signal, and a read out picture storage memory for separately storing said read out picture data, said buffer memory subsequently revising and storing the oldest one of the plurality of picture data.

20. A vehicle camera system according to claim 19, in which said buffer memory is composed of a plurality of frame memories each storing picture data for one frame.

21. A vehicle camera system according to claim 19, in which said camera is disposed on a road ahead of said gate.

22. A vehicle camera system according to claim 19, in which said camera is mounted on an arm crossing a road of said gate.

23. A vehicle camera system according to claim 19, in which said camera is mounted on a pole standing on an island of said gate.

24. A vehicle camera system according to claim 19, in which said camera has a view range capable of picking up at least a license plate of a vehicle which stops at a stop position of said gate, and at least the license plate and a driver of the vehicle which is positioned at a forward position of said stop position.

25. A vehicle camera system according to claim 19, further comprising:

a monitor for displaying a plurality of picture data read out from said buffer memory, and a selector switch for selecting which picture data should be separately stored from the plurality of said displayed picture data.

26. A vehicle camera system according to claim 19, further comprising vehicle detector for detecting a vehicle passing said gate and means for instructing writing picture data on said buffer memory.

27. A vehicle camera system according to claim 19, further comprising:

a detector for detecting that a vehicle passing the gate has arrived at a first detection point and a second detection point, and an instructor for instructing said buffer memory to write picture data from a time when said vehicle reaches said first detection point until a time when the vehicle reaches said second detection point, said camera being able to pick up at least a license plate of the vehicle at said first detection point and a license plate and a driver of the vehicle at said second detection point.

28. A vehicle camera system according to claim 19, in which said gate is disposed at a tollgate of a toll road.

29. A vehicle camera system according to claim 19, in which said gate is disposed in a parking lot.

30. A camera system comprising:

a camera for picking up picture data, a buffer memory including a plurality of frame memories each storing one frame of said picture data picked up by said camera, a reader responsive to the entry of a read out instruction signal for reading out one or a plurality of picture data from said buffer memory at least just before the timing of the entry of said read out instruction signal, a read out picture storage memory for separately storing said read out picture data, and a write instructor for applying a cyclic writing instruction of picture data to the plurality of frame memories of said buffer memory, said write instructor being adapted to apply a writing instruction to a subsequent frame memory at several frame periods.

31. A vehicle camera system according to claim 30, in which said read out instruction signal entered into said read out picture storage memory for reading out picture data from said buffer memory is based on a manual operation.

32. A vehicle camera system comprising:

a camera for picking up picture data of a vehicle passing a gate, a buffer memory for storing a plurality of said picture data picked up by said camera, a dishonest vehicle detector for detecting a vehicle dishonestly passing said gate, a reader responsive to the detection of a dishonest pass vehicle for reading out one or a plurality of picture data from said buffer memory at least just before the timing of the detection, and a read out picture storage memory for separately storing said read out picture data.

33. A vehicle camera system according to claim 32, in which said gate is disposed at a tollgate of a toll road, and said dishonest vehicle detection means detects a dishonestly passing vehicle based on a payment completion signal from a toll collector and a vehicle start signal generated from a start detector detecting start of a vehicle at a stop position of the gate.

34. A vehicle camera system comprising:

a camera for picking up a vehicle passing a gate, a buffer memory for storing a plurality of picture data picked up by said camera, a dishonest vehicle detector for detecting a vehicle dishonestly passing said gate, a reader responsive to the detection of a dishonest pass vehicle by said dishonest vehicle detection means or entry of a read out instruction signal for reading out one or a plurality of picture data from said buffer memory at least just before the timing of said detection or said entry, and a read out picture storage memory for separately storing said read out picture data.

35. A vehicle camera system according claim 34, in which said read out instruction signal entered into said read out picture storage memory for reading out picture data from said buffer memory is based on an operation.

36. A vehicle camera system comprising:

a camera for picking up picture data of a vehicle passing a gate, a detector for detecting a license plate of a vehicle based on the picture data picked up by said camera, a buffer memory for storing a plurality of picture data picked up by said camera, means for making storage of picture data effective on said buffer memory based on entry of detection signal representing detection of said license plate, a reader responsive to a read out instruction signal for reading out one or a plurality of picture data from said buffer memory at least just before the timing of said read out instruction signal, and a read out picture storage memory for separately storing said read out picture data.

37. A vehicle camera system according to claim 36, in which said license plate detector differentiates an input picture data in a horizontal scanning direction to be digitized to detect an edge thereof along a vertical scanning direction to recognize a plate candidate line when the number of the detected edges within a predetermined width in a horizontal direction is within a predetermined range and detect a license plate when a consecutive predetermined number of the plate candidate lines are recognized in the vertical scanning direction.

38. A vehicle camera system comprising:

a camera for picking up picture data of a vehicle passing a gate disposed in a parking lot, a detector for detecting whether said vehicle moved forward or backward from a stop position, a fee collector for generating a fee payment completion signal representing that said vehicle passing said gate paid a fee, a signal generator for generating a read out instruction signal based on said fee payment completion signal and an output from said detector, and a storage memory for storing a picture picked up by said camera upon entry timing of said read out instruction signal.

39. A vehicle camera system comprising:

a camera for picking up picture data of a vehicle passing a gate disposed in a parking lot, a license plate detector for detecting a license plate of said vehicle based on picture data picked up by said camera, a detector for detecting whether said vehicle moved forward or backward from a stop position, a buffer memory for storing a plurality of picture data picked up by said camera, means for instructing said buffer memory to write picture data therein based on entry of a detection signal representing detection of said license plate, means for generating a read out instruction signal based on fee payment and an output from said detector, a reader responsive to said read out instruction signal for reading out one or a plurality of picture data from said buffer memory at least just before the timing of said read out instruction signal, and a read out picture storage memory for separately storing said read out picture data.

40. A vehicle camera system according to claim 39, in which said license plate detector differentiates an input picture data in a horizontal scanning direction to be digitized and detect an edge thereof along a vertical scanning direction to recognize a plate candidate line when the number of the detected edges within a predetermined width in a horizontal direction is within a predetermined range and detect a license plate when a consecutive predetermined number of the plate candidate lines are recognized in the vertical scanning direction.

41. A camera system comprising:

a camera for picking up a picture, a predetermined picture detector for detecting a predetermined picture based on picture data picked up by said camera, a buffer memory including a plurality of frame memories each one frame of picture data picked up by said camera, a write instructor for instructing said buffer memory to write picture data therein based on entry of a detection signal representing detection of said predetermined picture, a reader responsive to a read out instruction signal for reading out one or a plurality of picture data from said buffer memory at least just before the timing of said read out instruction signal, and a read out picture storage memory for separately storing said read out picture data.

42. A camera system according to claim 41, in which said write-instructor instructs each of said frame memories to sequentially and cyclically write one frame of picture data therein when a detection signal representing the existence of a predetermined picture is entered from said predetermined picture detector but does not generate of any write instruction and stops switching of said frame memories when a detection signal representing nonexistence of any predetermined picture is entered from said predetermined picture detector.

43. A camera system comprising:

a camera for picking up a picture, a buffer memory for storing a plurality of picture data picked up by said camera, a reader responsive to a read out instruction signal for reading out one or a plurality of picture data from said buffer memory at least just before the timing of said read out instruction signal, and a memory for separately storing said read out picture data, in which said read out instruction signal entered into said reader for reading out said picture data from said buffer memory is based on an operation.

44. A vehicle camera system comprising:

a camera for picking up a picture, a predetermined picture detector for detecting a predetermined picture based on picture data picked up by said camera, a buffer memory including a plurality of frame memories each storing one frame of picture data picked up by said camera, writing means for instructing a cyclic writing of picture data to the plurality of frame memories of said buffer memory based on entry of a detection signal representing detection of said predetermined picture generated from said predetermined picture detector, and an operation unit disposed in said gate for generating a read out instruction signal to read picture data from said buffer memory, whereby one or a plurality of picture data are read out from a corresponding frame memory at least just before an operation timing in said operation unit.

45. A camera system comprising:

an object detector for detecting a object, a camera for picking up the object passing, a buffer memory including a plurality of frame memories each storing one frame of picture data picked up by said camera, and an operation unit for generating a read out instruction signal to read picture data from said buffer memory, whereby picture data of the object is cyclically stored in said respective frame memories when the object is detected by said object detector and upon an operation in said operation unit picture data are read out from a corresponding frame memory at least just before an operation timing in said operation unit.

46. A camera system comprising:

a camera for picking up a picture, a predetermined picture detector for detecting a predetermined picture based on the picture data picked up by said camera, a buffer memory for storing a plurality of picture data picked up by said camera, writing means for instructing said buffer memory to write picture data therein based on entry of a detection signal representing detection of said predetermined picture, a reader responsive to a read out instruction signal for reading out one or a plurality of picture data from said buffer memory at least just before the timing of said read out instruction signal, and a transmitting unit for transmitting said read out picture data to a central unit, said central unit including a receiving section for receiving picture data transmitted and a memory for separately storing the received picture data.

47. A camera system comprising:

a camera for picking up a picture, a predetermined picture detector for detecting a predetermined picture based on the picture data picked up by said camera, a buffer memory including a plurality of frame memories in which picture data picked up by said camera is alternately switched to be stored, a picture compressor for compressing the picture data read out from said buffer memory based on entry of a detection signal of said license plate from said predetermined picture detector, a mass storage unit for storing picture data compressed by said picture compressor, an operation unit disposed at said gate for manually generating a read out instruction signal to read said compressed picture data from said buffer memory, and a transmitting unit responsive to an operation in said operation unit for transmitting to a central unit said compressed picture data from said mass storage unit before the timing of said operation, said central unit including a receiving section for receiving said read out compressed picture data and a memory for separately storing the received compressed picture data.

48. A camera system comprising:

a camera for picking up a picture, a predetermined picture detector for detecting a predetermined picture based on the picture data picked up by said camera, a character recognizor for recognizing a character on said detected predetermined picture, a buffer memory including a plurality of frame memories storing picture data picked up by said camera, a storage unit for reading out picture data corresponding to a picture of a previously recognized predetermined picture from said buffer memory to be stored when said recognized character of the detected predetermined picture differs from the character of said previously recognized picture, a reader responsive to a read out instruction signal for reading out picture data from said storage unit before the entry timing of said read out instruction signal, and a read out picture storage memory for separately storing said read out picture data.

49. In a vehicle camera system applied to a road pricing system in which a charge data is by wireless written into a storage carried by a vehicle running on a road within a predetermined toll area, the improvement comprising:

a vehicle detector for detecting a vehicle running on said road, a camera for picking up the vehicle running on said road, a picture storage memory for storing a plurality of picture data picked up by said camera, a reader responsive to the entry of a read out instruction signal for reading out one or a plurality of picture data from said picture storing means at least just before the timing of the entry of said read out instruction signal, a read picture storage memory for separately storing said read out picture data, and an instructor for instructing said picture storage memory to write picture data therein based on entry of a detection signal of the vehicle.

50. A vehicle camera system comprising:

a camera for picking up a vehicle passing a gate, a picture memory for storing picture data picked up by said camera, a reader responsive to the entry of a read out instruction signal for reading out said picture data from said picture storage memory at least just before the timing of the entry of said read out instruction signal, and a read out picture storage memory for separately storing said read out picture data.

51. A method comprising the steps of:

picking up a picture by a camera, temporarily storing said picked up picture data into a buffer memory, reading out one or a plurality of picture data at least just before the timing of a read out instruction, and separately storing said read out picture data.

52. A method comprising the steps of:

picking up a picture of a vehicle passing a gate by a camera, temporarily storing said picked up picture data into a memory, reading out one or a plurality of picture data at least just before the timing of a read out instruction, and separately storing said read out picture data.

53. A method comprising the steps of picking up a vehicle passing a gate by a camera, storing picture data picked up by said camera in a memory, reading out said stored picture data at least just before the timing of entry of a read out instruction signal from said memory in response to the entry of said read out instruction signal, and storing means for separately storing said read out picture data in a media.

54. A method according to claim 53, in which said reading out is in response to a manual operation by an attendant at said gate.

55. A method according to claim 53, in which said reading out is in response to detection of a dishonest pass vehicle in said gate.

56. A camera system comprising:

a camera for picking up a picture, a buffer memory a plurality of picture data picked up by said camera, a reader responsive to the entry of a read out instruction signal for reading out one or a plurality of picture data from said buffer memory at least just before the timing of the entry of said read out instruction signal, and storing means for separately storing said read out picture data.

57. A camera system according to claim 56, in which said buffer memory is composed of a plurality of frame memories each storing picture data for one frame.

58. A camera system according to claim 56, further comprising:

a monitor for displaying a plurality of picture data read out from said buffer memory, and a selector switch for selecting which picture data should be separately stored from the plurality of said displayed picture data.

59. A vehicle camera system according to claim 56, further comprising object detector for detecting a object whose image is picked up by said camera and writing instructor for instructing writing picture data on said buffer memory.

60. A camera system comprising:

a camera for picking up a picture, a buffer memory for storing a plurality of picture data picked up by said camera, a reader responsive to the entry of a read out instruction signal for reading out one or a plurality of picture data from said buffer memory at least just before the timing of the entry of said read out instruction signal, and a read out picture storage memory for separately storing said read out picture data, said buffer memory subsequently revising and storing the oldest one of the plurality of picture data.

61. A camera system according to claim 60, in which said buffer memory is composed of a plurality of frame memories each storing picture data for one frame.

62. A camera system according to claim 60, further comprising:

a monitor for displaying a plurality of picture data read out from said buffer memory, and a selector switch for selecting which picture data should be separately stored from the plurality of said displayed picture data.

63. A vehicle camera system according to claim 60, further comprising object detector for detecting a object whose picture is picked up by said camera and writing instructor for instructing writing picture data on said buffer memory.

64. A camera system comprising:

a camera for picking up a picture, a detector for detecting a predetermined picture based on the picture data picked up by said camera, a buffer memory for storing a plurality of picture data picked up by said camera, means for making storage of picture data effective on said buffer memory based on entry of detection signal representing detection of said predetermined picture, a reader responsive to a read out instruction signal for reading out one or a plurality of picture data from said buffer memory at least just before the timing of said read out instruction signal, and a read out picture storage unit for separately storing said read out picture data.

65. A method comprising the steps of:

picking up a picture by a camera, storing picture data picked up by said camera in a memory, reading out said stored picture data from said memory at least just before the timing of entry of a read out instruction signal responsive to the entry of said read out instruction signal, and separately storing said read out picture data in a media.

66. A method according to claim 65, in which said reading out is responsive to detection of a predetermined pass picture.

* * * * *